US012699253B2

(12) United States Patent
Cho

(10) Patent No.: US 12,699,253 B2
(45) Date of Patent: Aug. 4, 2026

(54) IMAGING OPTICAL LENS ASSEMBLY, IMAGING APPARATUS AND ELECTRONIC DEVICE

(71) Applicant: LARGAN PRECISION CO., LTD., Taichung (TW)

(72) Inventor: Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 866 days.

(21) Appl. No.: 17/836,037

(22) Filed: Jun. 9, 2022

(65) Prior Publication Data

US 2023/0333348 A1 Oct. 19, 2023

(30) Foreign Application Priority Data

Mar. 8, 2022 (TW) .................................. 111108351

(51) Int. Cl.
*G02B 13/00* (2006.01)
*G02B 9/64* (2006.01)
(52) U.S. Cl.
CPC ........... *G02B 13/0045* (2013.01); *G02B 9/64* (2013.01)
(58) Field of Classification Search
CPC ....... G02B 9/64; G02B 13/16; G02B 13/0045
See application file for complete search history.

(56) References Cited

U.S. PATENT DOCUMENTS

| | | | |
|---|---|---|---|
| 4,756,609 A | 7/1988 | Estelle | |
| 2014/0139931 A1 | 5/2014 | Kuboda | |

| | | | | |
|---|---|---|---|---|
| 2020/0012078 A1* | 1/2020 | Kuo | ........................ | G02B 13/18 |
| 2020/0150386 A1 | 5/2020 | Wei et al. | | |
| 2020/0249434 A1* | 8/2020 | Lin | ........................ | G02B 13/18 |
| 2020/0400924 A1 | 12/2020 | Xu et al. | | |
| 2022/0003962 A1 | 1/2022 | Sun et al. | | |
| 2022/0003963 A1 | 1/2022 | Chen et al. | | |

FOREIGN PATENT DOCUMENTS

| | | |
|---|---|---|
| CN | 109298507 A | 2/2019 |
| CN | 110174743 A | 8/2019 |
| CN | 111198429 A | 5/2020 |
| CN | 211348830 U | 8/2020 |
| CN | 111856724 A | 10/2020 |

(Continued)

*Primary Examiner* — Mariam Qureshi

(74) *Attorney, Agent, or Firm* — Troutman Pepper Locke LLP; Tim Tingkang Xia, Esq.

(57) ABSTRACT

An imaging optical lens assembly includes seven lens elements, in order from an object side to an image side along an optical path, are a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The first lens element has negative refractive power. The object-side surface of the first lens element is concave in a paraxial region thereof and the image-side surface of the first lens element is convex in a paraxial region thereof. The object-side surface of the second lens element is convex in a paraxial region thereof. With specific conditions being satisfied, the imaging optical lens assembly can be miniaturized while providing superior image quality.

8 Claims, 20 Drawing Sheets

(56)        References Cited

FOREIGN PATENT DOCUMENTS

| | | | |
|---|---|---|---|
| CN | 111856725 | A | 10/2020 |
| CN | 112731630 | A | 4/2021 |
| CN | 113126268 | A | 7/2021 |
| CN | 113138458 | A | 7/2021 |
| CN | 113281886 | A | 8/2021 |
| CN | 113406774 | A | 9/2021 |
| CN | 114114638 | A | 3/2022 |
| CN | 216411717 | U | 4/2022 |
| JP | H1152239 | A | 2/1999 |
| TW | 202030517 | A | 8/2020 |
| WO | 2021027287 | A1 | 2/2021 |
| WO | 2021063103 | A1 | 4/2021 |
| WO | 2021143436 | A1 | 7/2021 |
| WO | 2022000647 | A1 | 1/2022 |

* cited by examiner

240

236

234

340

336

334

332

300

IMAGING OPTICAL LENS ASSEMBLY, IMAGING APPARATUS AND ELECTRONIC DEVICE

RELATED APPLICATIONS

This application claims priority to Taiwan Application Serial Number 111108351, filed on Mar. 8, 2022, which is incorporated by reference herein in its entirety.

BACKGROUND

Technical Field

The present disclosure relates to an imaging optical lens assembly and an imaging apparatus, and more particularly, to an imaging optical lens assembly and an imaging apparatus applicable to electronic devices.

Description of Related Art

With the advancement in semiconductor process technology, performances of image sensors have been improved, and pixels have been reduced to even smaller sizes. Therefore, imaging optical systems with high image quality have become an indispensable part of modern electronic devices.

With the rapid development of science and technology, the application range of electronic devices equipped with imaging optical systems have become wider, and the requirements for optical lens assemblies have become more diverse. It is difficult for conventional imaging optical systems to achieve a balance among multiple requirements, such as image quality, sensitivity, aperture size, volume or field of view. Therefore, there is a need for an imaging optical system that satisfies the aforementioned requirements.

SUMMARY

According to one aspect of the present disclosure, an imaging optical lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side, wherein the first lens element has negative refractive power, the object-side surface of the first lens element is concave in a paraxial region thereof and the image-side surface of the first lens element is convex in a paraxial region thereof, the object-side surface of the second lens element is convex in a paraxial region thereof.

A focal length of the imaging optical lens assembly is f, a focal length of the first lens element is f1, a composite focal length of the sixth lens element and the seventh lens element is f67, a curvature radius of the object-side surface of the first lens element is R1, a curvature radius of the image-side surface of the first lens element is R2, a curvature radius of the object-side surface of the third lens element is R5, a curvature radius of the image-side surface of the third lens element is R6, a curvature radius of the image-side surface of the sixth lens element is R12, a curvature radius of the object-side surface of the seventh lens element is R13, a curvature radius of the image-side surface of the seventh lens element is R14, and the following conditions are satisfied:

$$-2.50 < f/f1 < -0.25;$$

$$0.00 < f/f67 < 2.50;$$

$$0.12 < R1/R2;$$

$$(R5+R6)/(R5-R6) < 1.20;$$

$$0.10 < (R12+R13)/(R12-R13) < 5.00; \text{ and}$$

$$-1.55 < (R13-R14)/(R13+R14).$$

According to one aspect of the present disclosure, an imaging apparatus comprises the aforementioned imaging optical lens assembly and an image sensor.

According to another aspect of the present disclosure, an electronic device comprises the aforementioned imaging apparatuses.

According to one aspect of the present disclosure, an imaging optical lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side, wherein the first lens element has negative refractive power, the object-side surface of the first lens element is concave in a paraxial region thereof and the image-side surface of the first lens element is convex in a paraxial region thereof, the image-side surface of the seventh lens element has at least one inflection point.

A focal length of the imaging optical lens assembly is f, a composite focal length of the first lens element and the second lens element is f12, a focal length of the fifth lens element is f5, a curvature radius of the image-side surface of the sixth lens element is R12, a curvature radius of the object-side surface of the first lens element is R1, a curvature radius of the image-side surface of the first lens element is R2, and the following conditions are satisfied:

$$-2.50 < f/f12 < -0.10;$$

$$-0.70 < f/f5 < 2.50;$$

$$-2.40 < f/R1 < -0.65;$$

$$-1.50 < f/R12 < -0.10; \text{ and}$$

$$0.16 < R1/R2 < 1.00.$$

According to one aspect of the present disclosure, an imaging optical lens assembly comprises seven lens elements. The seven lens elements in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side, wherein the first lens element has negative refractive power, the object-side surface of the first lens element is concave in a paraxial region thereof and the image-side surface of the first lens element is convex in a paraxial region thereof, the image-side surface of the sixth lens element is convex in a paraxial region thereof, the image-side surface of the seventh lens element has at least one inflection point.

A focal length of the imaging optical lens assembly is f, a focal length of the fifth lens element is f5, a focal length of the seventh lens element is f, a curvature radius of the object-side surface of the first lens element is R1, a curvature radius of the image-side surface of the first lens element is R2, a curvature radius of the object-side surface of the seventh lens element is R13, and the following conditions are satisfied:

$$-0.57 < f/f5 < 2.50;$$

$$-0.25 < f/f7 < 2.50;$$

$$0.12 < R1/R2 < 0.80; \text{ and}$$

$$0.50 < f/R13 < 3.50.$$

DETAILED DESCRIPTION

Figure 1A:
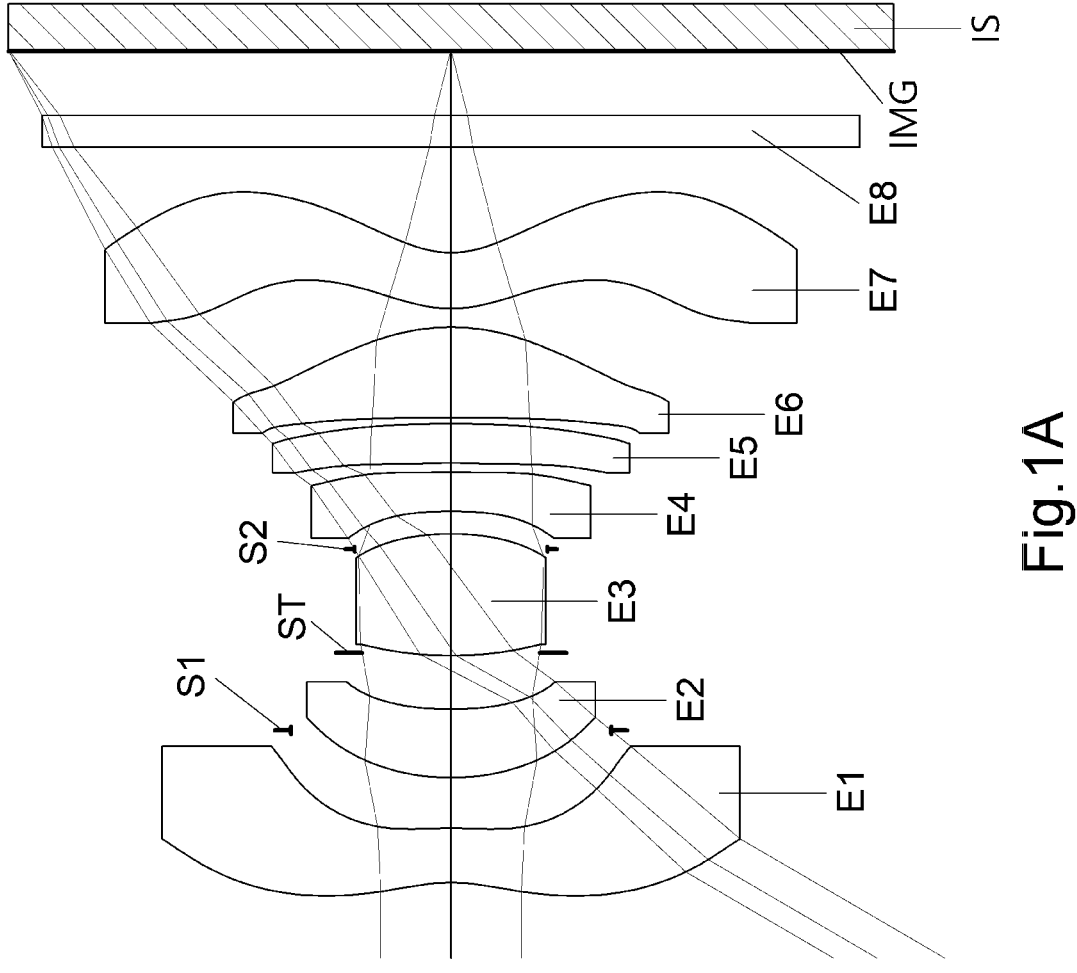
FIG. 1A is a schematic view of an imaging apparatus according to the 1st embodiment of the present disclosure.

The present disclosure provides an imaging optical lens assembly including seven lens elements. The seven lens elements, in order from an object side to an image side along an optical path are a first lens element, a second lens element, a third lens element, a fourth lens element, a fifth lens element, a sixth lens element and a seventh lens element. Each of the first through seventh lens elements has an object-side surface facing the object side and an image-side surface facing the image side.

The first lens element has negative refractive power which helps to compress the volume of the first lens element and the second lens element of the imaging optical lens assembly.

The object-side surface of the first lens element is concave in a paraxial region thereof to modify the surface shape of the first lens element to help to reduce the effective diameter of the first lens element and reduce the overall length of the entire lens elements. The image-side surface of the first lens element is convex in a paraxial region thereof to modify the surface shape of the first lens element to help correct aberrations such as astigmatism. The object-side surface of the first lens element includes at least one critical point, which helps to reduce the aberrations in the peripheral field.

The object-side surface of the second lens element is convex in a paraxial region thereof, enabling to adjust the traveling direction of the light to help to increase the imaging surface.

The image-side surface of the sixth lens element is convex in a paraxial region thereof to modify the shape of the image-side surface of the sixth lens element to help reduce the back focal length.

The image-side surface of the seventh lens element has at least one inflection point, enabling to adjust the incident angle of the light on the imaging surface to help to reduce the impact of assembly errors on spot sizes of the peripheral field. The image-side surface of the seventh lens element include at least one critical point, which helps to reduce the aberrations in the peripheral field.

A focal length of the imaging optical lens assembly is f, a focal length of the first lens element is f1. When the following condition is satisfied: $-2.50 < f/f1 < -0.25$, the refractive power of the first lens element can be adjusted, which helps to reduce spot sizes of the central field. Moreover, the following condition can be satisfied: $-1.20 < f/f1 < -0.38$. Moreover, the following condition can be satisfied: $-0.82 < f/f1 < -0.30$.

A focal length of the imaging optical lens assembly is f, a composite focal length of the sixth lens element and the seventh lens element is f67. When the following condition is satisfied: $0.00 < f/f67 < 2.50$, the overall refractive power of the sixth lens element to the seventh lens element can be adjusted, which can reduce the astigmatic aberration in the central field and its nearby fields. Moreover, the following condition can be satisfied: $0.25 < f/f67 < 1.50$. Moreover, the following condition can be satisfied: $0.25 < f/f67 < 0.90$. Moreover, the following condition can be satisfied: $0.30 < f/f67 < 0.75$.

A curvature radius of the object-side surface of the first lens element is R1, a curvature radius of the image-side surface of the first lens element is R2. When the following condition is satisfied: 0.12<R1/R2, the ratio of the central curvature radius of the object-side surface to the central curvature radius of the image-side surface of the first lens element can be adjusted, which helps to reduce the effective diameter of the first lens element, so as to reduce the proportion of the opening of the imaging optical lens assembly occupying the screen of the electronic device. Moreover, the following condition can be satisfied: 0.16<R1/R2<1.00. Moreover, the following condition can be satisfied: 0.18<R1/R2<0.80. Moreover, the following condition can be satisfied: 0.12<R1/R2<0.80.

A curvature radius of the object-side surface of the third lens element is R5, a curvature radius of the image-side surface of the third lens element is R6. When the following condition is satisfied: (R5+R6)/(R5-R6)<1.20, the surface shape and refractive power of the third lens element can be adjusted to help reduce distortion aberration. Moreover, the following condition can be satisfied: −6.00<(R5+R6)/(R5-R6)<0.50. Moreover, the following condition can be satisfied: −7.50<(R5+R6)/(R5-R6)<0.45.

A curvature radius of the image-side surface of the sixth lens element is R12, a curvature radius of the object-side surface of the seventh lens element is R13. When the following condition is satisfied: 0.10<(R12+R13)/(R12-R13)<5.00, the shape of the image-side surface of the sixth lens element and the shape of the object-side surface of the seventh lens element can be adjusted, which helps to increase the light-converging quality in the central field and its nearby fields. Moreover, the following condition can be satisfied: 0.10<(R12+R13)/(R12-R13)<3.00. Moreover, the following condition can be satisfied: 0.10<(R12+R13)/(R12-R13)<1.50.

A curvature radius of the object-side surface of the seventh lens element is R13, a curvature radius of the image-side surface of the seventh lens element is R14. When the following condition is satisfied: −1.55<(R13-R14)/(R13+R14), the surface shape and refractive power of the seventh lens element can be adjusted to help reduce the back focal length. Moreover, the following condition can be satisfied: −0.50<(R13−R14)/(R13+R14)<1.00. Moreover, the following condition can be satisfied: −0.30<(R13−R14)/(R13+R14)<0.5.

A focal length of the imaging optical lens assembly is f, a curvature radius of the object-side surface of the first lens element is R1, When the following condition is satisfied: −2.40<f/R1<−0.65, the ratio of the focal length f to the central curvature radius of the object-side surface of the first lens element can be adjusted, which helps to increase the field of view and reduce the effective diameter of the first lens element. Moreover, the following condition can be satisfied: −2.00<f/R1<−0.75. Moreover, the following condition can be satisfied: −1.75<f/R1<−1.15. Moreover, the following condition can be satisfied: −1.75<f/R1<−1.10.

The imaging optical lens assembly further includes an aperture stop, an axial distance between the aperture stop and the image surface is SL, an axial distance between the object-side surface of the first lens element and the image surface is TL. When the following condition is satisfied: 0.52<SL/TL<0.81, the ratio of the total length of the imaging optical lens assembly to the distance from the aperture stop to the image surface can be adjusted, which helps to reduce the volume of the imaging optical lens assembly and increase the relative illuminance of the peripheral field.

A focal length of the imaging optical lens assembly is f, a composite focal length of the first lens element, the second lens element, the third lens element and the fourth lens element is f1234. When the following condition is satisfied:

−0.25<f/f1234<0.82, the overall refractive power of the first lens element to the fourth lens element can be adjusted, which helps to reduce spherical aberration in the central field. Moreover, the following condition can be satisfied: 0.25<f/f1234<0.75. Moreover, the following condition can be satisfied: 0.25<f/f1234<1.50. Moreover, the following condition can be satisfied: 0.25<f/f1234<1.20.

A maximum value among all axial distances between each of adjacent lens elements of the imaging optical lens assembly is MaxAT, a sum of all axial distances between each of adjacent lens elements of the imaging optical lens assembly is ΣAT. When the following condition is satisfied: 0.17<MaxAT/ΣAT<0.40, the ratio of the maximum axial distance between adjacent lens elements to the sum of all axial distances between each of adjacent lens elements can be adjusted, which helps to balance the lens elements distribution and reduce assembly errors.

A focal length of the imaging optical lens assembly is f, a focal length of the second lens element is f2. When the following condition is satisfied: −0.60<f/f2<0.70, the refractive power of the second lens element can be adjusted, and it can cooperate with the first lens element to reduce the effective diameters of the first lens element and the second lens element.

An on-axis thickness of the first lens element along the optical path is CT1, an axial distance between the first lens element and the second lens element is T12, a focal length of the imaging optical lens assembly is f. When the following condition is satisfied: 0.25<(CT1+T12)/f<0.50, the ratio of the focal length f to the distance from the object-side of the first lens element to the object-side of the second lens element can be adjusted, which is helpful for configuring the position of the first lens element to increase the field of view.

A focal length of the imaging optical lens assembly is f, a composite focal length of the first lens element and the second lens element is f12. When the following condition is satisfied: −2.50<f/f12<−0.10, the overall refractive power of the first lens element to the second lens element can be adjusted, which is helpful to receive light from a wide field of view and reduce the total length of the imaging optical lens assembly. Moreover, the following condition can be satisfied: −1.00<f/f12<−0.10.

A focal length of the imaging optical lens assembly is f, a focal length of the fifth lens element is f5. When the following condition is satisfied: −0.70<f/f5<2.50, the refractive power of the fifth lens element can be adjusted, and it can cooperate with the sixth lens element to reduce the volume of the fifth lens element and the sixth lens element. Moreover, the following condition can be satisfied: −0.50<f/f5<1.00. Moreover, the following condition can be satisfied: −0.60<f/f5<0.60. Moreover, the following condition can be satisfied: −0.50<f/f5<1.00. Moreover, the following condition can be satisfied: −0.57<f/f5<2.50. Moreover, the following condition can be satisfied: −0.57<f/f5<1.00.

A focal length of the imaging optical lens assembly is f, a curvature radius of the image-side surface of the sixth lens element is R12. When the following condition is satisfied: −1.50<f/R12<−0.10, the ratio of the focal length f to the center curvature radius of the image-side surface of the sixth lens element can be adjusted, which helps to increase the central light-converging quality and reduce the back focal length. Moreover, the following condition can be satisfied: −1.50<f/R12<−0.50. Moreover, the following condition can be satisfied: −1.40<f/R12<−0.40.

A focal length of the imaging optical lens assembly is f, a composite focal length of the third lens element, the fourth lens element and the fifth lens element is f345. When the following condition is satisfied: $-0.20 < f/f345 < 1.00$, the overall refractive power of the third lens element to the fifth lens element can be adjusted, which helps to balance the refractive power of the overall lens elements and reduce the eccentric sensitivity of each lens elements. Moreover, the following condition can be satisfied: $0.15 < f/f345 < 0.90$. Moreover, the following condition can be satisfied: $0.30 < f/f345 < 1.00$.

An axial distance between the fourth lens element and the fifth lens element is T45, an axial distance between the fifth lens element and the sixth lens element is T56, an axial distance between the sixth lens element and the seventh lens element is T67, a sum of all axial distances between each of adjacent lens elements of the imaging optical lens assembly is $\Sigma AT$. When the following condition is satisfied: $0.00 < (T45+T56+T67)/\Sigma AT < 0.49$, the ratio of the sum of all axial distances between each of adjacent lens elements from the fourth lens element to the seventh lens element to the sum of all axial distances between each of adjacent lens elements from the first lens element to the seventh lens element can be adjusted, which helps to distribute the positions of the fourth lens element to the seventh lens element and reduce the total length of the imaging optical lens assembly. Moreover, the following condition can be satisfied: $0.20 < (T45+T56+T67)/\Sigma AT < 0.40$.

A refractive index of the second lens element is N2. When the following condition is satisfied: $1.63 < N2 < 1.95$, the refractive index of the second lens element can be adjusted, which helps to reduce the overall volume of the lens assembly.

An axial distance between the object-side surface of the first lens element and the image-side surface of the seventh lens element is TD, an axial distance between the object-side surface of the first lens element and the image surface is TL. When the following condition is satisfied: $0.50 < TD/TL < 0.82$, the ratio of the axial distance between the object-side of the first lens element and the image-side of the seventh lens element to the axial distance between the object-side surface of the first lens element and the image surface can be adjusted, which is helpful for achieving a balance between increasing the volume utilization of the imaging apparatus or electronic device and the assembly yield. Moreover, the following condition can be satisfied: $0.65 < TD/TL < 0.80$.

A focal length of the imaging optical lens assembly is f, a focal length of the seventh lens element is V. When the following condition is satisfied: $-0.25 < f/f7 < 2.50$, the refractive power of the seventh lens element can be adjusted, and the back focal length can be reduced. Moreover, the following condition can be satisfied: $-0.25 < f/f7 < 1.20$.

A focal length of the imaging optical lens assembly is f, a curvature radius of the object-side surface of the seventh lens element is R13. When the following condition is satisfied: $0.50 < f/R13 < 3.50$, the ratio of the focal length f to the central curvature radius of the object-side surface of the seventh lens element can be adjusted, which helps to compress the volume of the imaging optical lens assembly and correct the aberration of the imaging optical lens assembly.

A refractive index of the second lens element is N2, a refractive index of the third lens element is N3. When the following condition is satisfied: $1.59 < (N2+N3)/2 < 1.85$, the average refractive index of the second lens element and the third lens element can be adjusted, which helps to increase the image height and reduce the effective diameter of the second lens element. Moreover, the following condition can be satisfied: $1.63 < (N2+N3)/2 < 1.82$.

The f-number of the imaging optical lens assembly is FNO. When the following condition is satisfied: $1.90 < FNO < 2.25$, the aperture size of the aperture stop can be adjusted, which helps to improve the photographing quality at dark sites.

A focal length of the imaging optical lens assembly is f, a composite focal length of the fifth lens element, the sixth lens element and the seventh lens element is f567. When the following condition is satisfied: $0.10 < f/f567 < 1.20$, the overall refractive power of the fifth lens element to the seventh lens element can be adjusted, the refractive power of all lens elements behind the aperture stop can be balanced, and spherical aberration in the central field and its nearby fields can be reduced. Moreover, the following condition can be satisfied: $0.20 < f/f567 < 0.90$.

The present disclosure further provides an imaging apparatus comprising the aforementioned imaging optical lens assembly and an image sensor disposed on or near the image surface.

The present disclosure further provides an electronic device comprising three or more imaging apparatuses, wherein the three or more imaging apparatuses include the aforementioned imaging apparatus and face the same direction, so that telephoto and wide-angle features can be provided.

Figure 7:
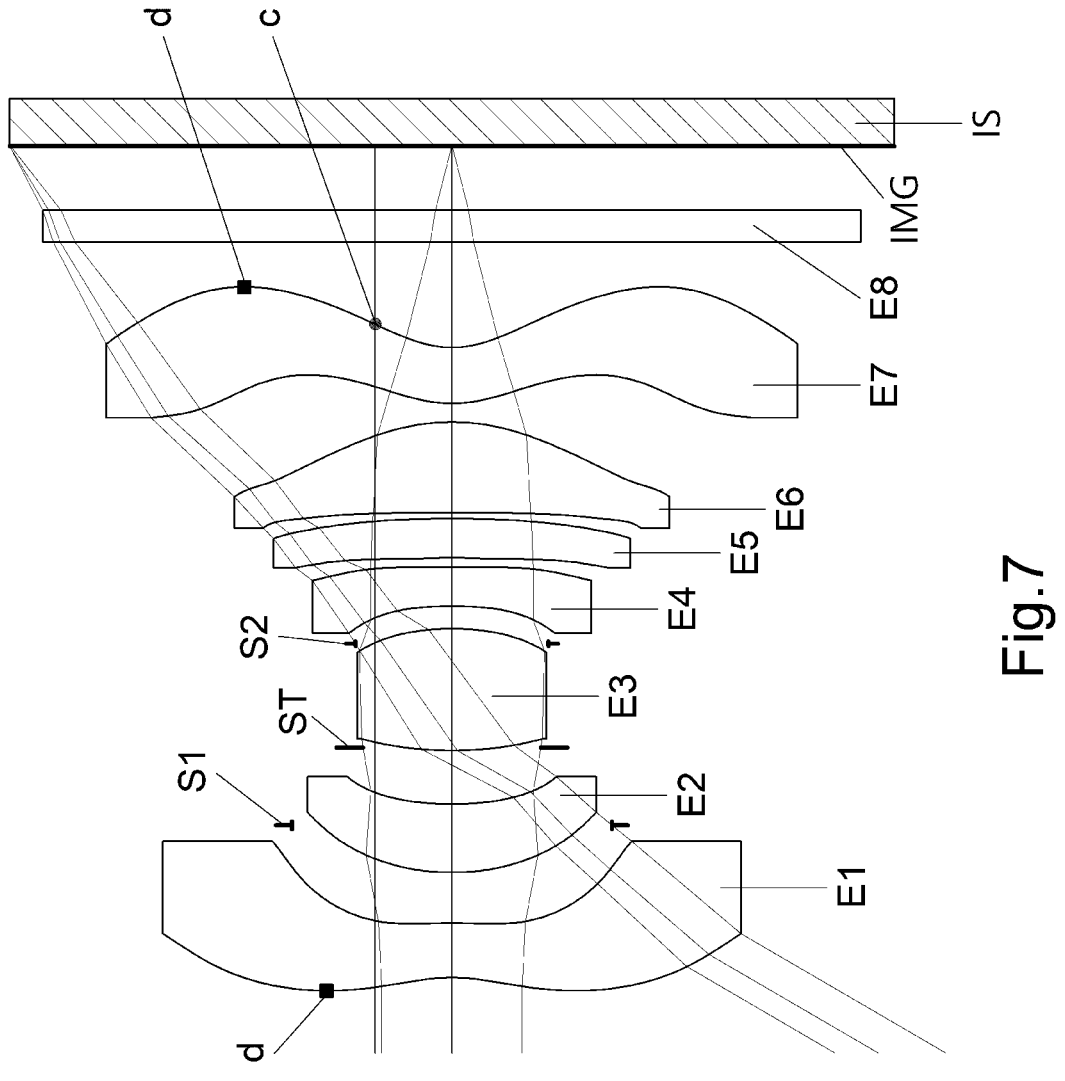
FIG. 7 is a schematic view illustrating critical points and inflection points on the lens surfaces of the imaging optical lens assembly with the 1st embodiment of the present disclosure as an example.

Please refer to FIG. 7, the inflection point c on the lens surface of the imaging optical lens assembly of the present invention is inflection point on the lens surface where the curvature radius thereof changes between positive and negative at the inflection point, and the critical point d is the tangent point on the surface of the lens element, which is tangent to a tangential plane perpendicular to the optical axis, except for the intersection with the optical axis.

The aforementioned features of the imaging optical lens system can be utilized in numerous combinations so as to achieve corresponding effects.

According to the imaging optical lens system of the present disclosure, the object-side and the image-side refer to the direction along the optical axis.

According to the imaging optical lens assembly of the present disclosure, the optical elements thereof can be made of glass or plastic material. When the optical elements are made of glass material, the distribution of the refractive power of the imaging lens system may be more flexible to design and the effect of external environmental temperature on imaging can be reduced. Technologies such as grinding or molding can be used for producing glass optical elements. When the optical elements are made of plastic material, manufacturing costs can be effectively reduced. Furthermore, surfaces of each optical element can be arranged to be spherical or aspheric (ASP). Arranging the spherical surfaces can reduce difficulties in manufacturing while arranging the aspheric surfaces can result in more control variables for eliminating aberrations and to further decrease the required quantity of optical elements; also, the total track length of the imaging optical lens assembly can be effectively reduced. Processes such as plastic injection molding or molded glass lens can be used for making the aspheric surfaces. The material of the optical elements of the present disclosure can be made of cyclo olefin polymer, and the cyclo olefin polymer can be a copolymer.

According to the imaging optical lens assembly of the present disclosure, if a surface of an optical element is aspheric, it means that the surface has an aspheric shape throughout its optical effective area, or a portion(s) thereof.

According to the imaging optical lens assembly of the present disclosure, additives may be selectively added to the material of any one (or more) optical element to change the transmittance of said optical element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, additives can prevent unwanted disrupting light in particular wavelength ranges affecting the final image. In addition, additives may be evenly mixed in the plastic material for manufacturing optical elements with an injection molding process.

According to the imaging optical lens system of the present disclosure, the photographing optical lens system can include at least one stop, such as an aperture stop, a glare stop or a field stop so as to favorably reduce the amount of stray light and thereby improve the image quality.

According to the imaging optical lens assembly of the present disclosure, an aperture stop can be configured as a front stop or a middle stop. The front stop disposed between an imaged object and the first optical element can provide a longer distance between an exit pupil of the optical lens assembly and the image surface, so that the generated telecentric effect can improve the image-sensing efficiency of an image sensor, such as a CCD or CMOS sensor. The middle stop disposed between the first optical element and the image surface is favorable for enlarging the field of view of the imaging optical lens assembly, thereby providing the optical lens assembly with the advantage of a wide-angle lens.

An aperture control unit may be disposed in the imaging optical lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the imaging optical lens assembly.

According to the imaging optical lens system of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

According to the imaging optical lens system of the present disclosure, the image surface of the imaging optical lens system, based on the corresponding image sensor, can be a plane or a curved surface with an arbitrary curvature, especially a curved surface being concave facing the object side. Meanwhile, the imaging optical lens system of the present disclosure may optionally include one or more image correction components (such as a field flattener) between the image surface and the optical element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and arranged near the image surface.

According to the above description of the present disclosure, the following specific embodiments are provided for further explanation.

1st Embodiment

Figure 1B:
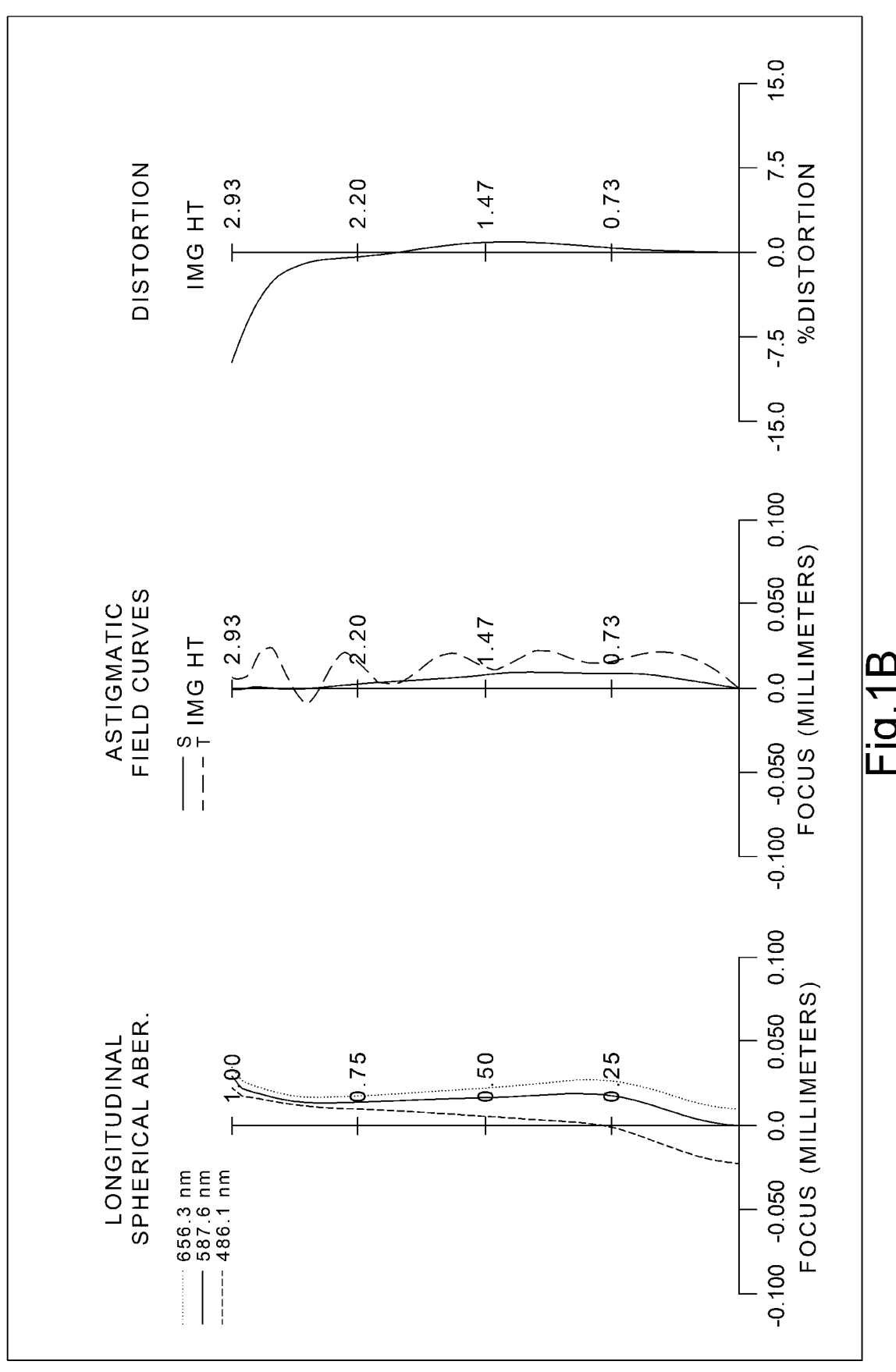
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an imaging optical lens assembly 1 of the present disclosure and an image sensor IS. The imaging optical lens assembly 1 includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has positive refractive power and is made of plastic material. The second lens element E2 has an object-side surface being convex in a paraxial region thereof and having one inflection point on the object-side surface, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof and having one inflection point on the object-side surface, and an image-side surface being convex in a paraxial region thereof. Both the object-side surface and the image-side surface are aspheric.

The fourth lens element E4 has negative refractive power and is made of plastic material. The fourth lens element E4 has an object-side surface being concave in a paraxial region thereof, and an image-side surface being convex in a paraxial region thereof and having three inflection points on the image-side surface. Both the object-side surface and the image-side surface are aspheric.

The fifth lens element E5 has negative refractive power and is made of plastic material. The fifth lens element E5 has an object-side surface being concave in a paraxial region thereof and having two inflection points on the object-side surface, and an image-side surface being convex in a paraxial region thereof. Both the object-side surface and the image-side surface are aspheric.

The sixth lens element E6 has positive refractive power and is made of plastic material. The sixth lens element E6 has an object-side surface being concave in a paraxial region thereof and having two inflection points on the object-side surface, and an image-side surface being convex in a paraxial region thereof and having two inflection points on the image-side surface. Both the object-side surface and the image-side surface are aspheric.

The seventh lens element E7 has negative refractive power and is made of plastic material. The seventh lens element E7 has an object-side surface being convex in a paraxial region thereof and having three inflection points and one critical point on the object-side surface, and an image-side surface being concave in a paraxial region thereof and having one inflection point and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 1. The image sensor IS is disposed on or near the image surface IMG.

The detailed optical data of the 1st embodiment are shown in TABLE TA, wherein the units of the curvature radius, the thickness and the focal length are expressed in mm, f is a focal length of the imaging optical lens assembly, Fno is an f-number of the imaging optical lens assembly, HFOV is half of the maximal field of view, and surfaces #0 to #20 refer to the surfaces in order from the object side to the image side. The aspheric surface data are shown in TABLE 1B, wherein k is the conic coefficient in the equation of the aspheric surface profiles, and A4-A28 refer to the 4th to 28th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1A and TABLE 1B for the 1st embodiment. Explanations in this regard will not be provided again.

TABLE 1A (1st Embodiment)
f = 1.89 mm, Fno = 2.03, HFOV = 59.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.1795 | (ASP) | 0.361 | Plastic | 1.545 | 56.1 | −3.37 |
| 2 | | −3.6463 | (ASP) | 0.650 | | | | |
| 3 | Stop | Plano | | −0.313 | | | | |
| 4 | Lens 2 | 1.6433 | (ASP) | 0.453 | Plastic | 1.660 | 20.4 | 8.31 |
| 5 | | 2.0888 | (ASP) | 0.376 | | | | |
| 6 | Ape. Stop | Plano | | −0.020 | | | | |
| 7 | Lens 3 | 2.4847 | (ASP) | 0.808 | Plastic | 1.544 | 56.0 | 2.06 |
| 8 | | −1.8018 | (ASP) | −0.100 | | | | |
| 9 | Stop | Plano | | 0.249 | | | | |
| 10 | Lens 4 | −3.0302 | (ASP) | 0.260 | Plastic | 1.686 | 18.4 | −9.47 |
| 11 | | −5.8774 | (ASP) | 0.062 | | | | |
| 12 | Lens 5 | −2.6383 | (ASP) | 0.260 | Plastic | 1.587 | 28.3 | −6.98 |
| 13 | | −7.6699 | (ASP) | 0.040 | | | | |
| 14 | Lens 6 | −17.8811 | (ASP) | 0.601 | Plastic | 1.544 | 56.0 | 2.89 |
| 15 | | −1.4617 | (ASP) | 0.124 | | | | |
| 16 | Lens 7 | 0.8412 | (ASP) | 0.371 | Plastic | 1.534 | 56.0 | −12.96 |
| 17 | | 0.6349 | (ASP) | 0.700 | | | | |
| 18 | Filter | Plano | | 0.210 | Glass | 1.517 | 64.2 | — |
| 19 | | Plano | | 0.426 | | | | |
| 20 | Image Surface | Plano | | — | | | | |

Remark: Reference wavelength is d-line 587.6 nm.
* The effective radius of the stop on Surface 3 is 1.062 mm.
* The effective radius of the stop on Surface 9 is 0.639 mm.

TABLE 1B

Aspheric Coefficient

| Surface # | 1 | 2 | 4 | 5 |
|---|---|---|---|---|
| K= | −1.00000000E+00 | 2.85988000E+00 | −8.52507000E−02 | −7.66160000E−01 |
| A4= | 1.01315355E+00 | 1.09496191E+00 | 2.69208651E−01 | 2.39696077E−01 |
| A6= | −1.90496790E+00 | −1.21955822E+00 | −9.30033132E−01 | −6.92606081E−01 |
| A8= | 3.05367738E+00 | −2.20192202E+00 | 2.99177723E+00 | 6.10615572E+00 |
| A10= | −3.81692028E+00 | 1.74432835E+01 | −7.62078021E+00 | −2.97913229E+01 |
| A12= | 3.61067187E+00 | −5.08903064E+01 | 1.49519315E+01 | 9.63895354E+01 |
| A14= | −2.55648845E+00 | 9.01088684E+01 | −2.03762521E+01 | −1.83479681E+02 |
| A16= | 1.34699202E+00 | −1.04023701E+02 | 1.80970865E+01 | 1.83543775E+02 |
| A18= | −5.23741162E−01 | 7.85269805E+01 | −9.37115050E+00 | −6.34031528E+01 |
| A20= | 1.47880725E−01 | −3.72769021E+01 | 2.08846206E+00 | −1.58074177E+01 |
| A22= | −2.94332412E−02 | 1.00575941E+01 | | |
| A24= | 3.90993096E−03 | −1.17135916E+00 | | |

TABLE 1B-continued

| Aspheric Coefficient | |
| --- | --- |
| A26= | −3.10855155E−04 |
| A28= | 1.11796952E−05 |

| Surface # | 7 | 8 | 10 | 11 |
| --- | --- | --- | --- | --- |
| K= | 0.00000000E+00 | 2.51097000E+00 | 0.00000000E+00 | 7.09075000E+00 |
| A4= | 1.55045079E−02 | −1.15534523E−01 | −2.02547933E−01 | 1.38762197E+00 |
| A6= | 1.46255443E+00 | −2.76267055E+00 | −4.35410342E+00 | −1.11303872E+01 |
| A8= | −2.64796170E+01 | 2.95134666E+01 | 1.94753752E+01 | 4.45891610E+01 |
| A10= | 2.74723592E+02 | −1.81180286E+02 | 2.01465104E+01 | −1.13961609E+02 |
| A12= | −1.74808730E+03 | 7.29995110E+02 | −5.62667965E+02 | 2.01043902E+02 |
| A14= | 6.87554338E+03 | −1.95987982E+03 | 2.71004857E+03 | −2.56025270E+02 |
| A16= | −1.63337438E+04 | 3.36231289E+03 | −6.98084830E+03 | 2.38483876E+02 |
| A18= | 2.14800764E+04 | −3.32445518E+03 | 1.05138317E+04 | −1.55918676E+02 |
| A20= | −1.20246298E+04 | 1.43683375E+03 | −8.72322883E+03 | 6.33628879E+01 |
| A22= | | | 3.08197466E+03 | −1.18421000E+01 |
| A24= | | | | |
| A26= | | | | |
| A28= | | | | |

| Surface # | 12 | 13 | 14 | 15 |
| --- | --- | --- | --- | --- |
| K= | 1.35555000E+00 | 3.20823000E+01 | 6.23860000E+01 | −7.89499000E−01 |
| A4= | 1.85367656E+00 | 1.15672939E−01 | 1.32956803E−01 | −1.41596861E−01 |
| A6= | −9.76979838E+00 | −8.59364454E−01 | −8.55016291E−01 | 6.86127837E−01 |
| A8= | 3.07386608E+01 | 2.24608325E+00 | 1.88285947E+00 | −9.24568455E−01 |
| A10= | −6.36840690E+01 | −1.83961972E+00 | 1.81600614E−01 | −1.08107138E+00 |
| A12= | 9.37804525E+01 | −3.26025348E+00 | −8.77273770E+00 | 7.20709893E+00 |
| A14= | −1.06736823E+02 | 9.91172639E+00 | 1.81627236E+01 | −1.44762866E+01 |
| A16= | 9.82206059E+01 | −1.11673271E+01 | −1.83390250E+01 | 1.63287481E+01 |
| A18= | −6.99490575E+01 | 6.66977740E+00 | 1.02997192E+01 | −1.14578553E+01 |
| A20= | 3.45002786E+01 | −2.09559141E+00 | −3.09174006E+00 | 5.10968663E+00 |
| A22= | −1.01006232E+01 | 2.73393283E−01 | 3.88172576E−01 | −1.41234703E+00 |
| A24= | 1.29730960E+00 | | | 2.21187054E−01 |
| A26= | | | | −1.50307750E−02 |
| A28= | | | | |

| Surface # | 16 | 17 |
| --- | --- | --- |
| K= | −9.84684000E−01 | −1.00000000E+00 |
| A4= | −8.40540926E−01 | −9.68207726E−01 |
| A6= | 9.86102938E−01 | 1.14574604E+00 |
| A8= | −1.25090609E+00 | −1.21805850E+00 |
| A10= | 1.37126043E+00 | 1.05141891E+00 |
| A12= | −1.12309087E+00 | −7.05637733E−01 |
| A14= | 6.43676609E−01 | 3.59245943E−01 |
| A16= | −2.52936140E−01 | −1.36768180E−01 |
| A18 | 6.75464466E−02 | 3.84203870E−02 |
| A20= | −1.20329630E−02 | −7.81064147E−03 |
| A22= | 1.36718527E−03 | 1.11273930E−03 |
| A24= | −8.94810272E−05 | −1.05002547E−04 |
| A26= | 2.56165655E−06 | 5.87836724E−06 |
| A28 | | −1.47466250E−07 |

The equation of the aspheric surface profiles is expressed as follows:

$$X(Y) = (Y^2/R) \Big/ \left( 1 + sqrt\left(1 - (1+k)*(Y/R)^2\right) + \sum_i (Ai)*(Y^i) \right)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the on-axis thickness of the first lens element E1 is CT1, the axial distance between the first lens element E1 and the second lens element E2 is T12, the focal length of the imaging optical lens assembly is f, and the following condition is satisfied: (CT1+T12)/f=0.37.

In the 1st embodiment, the refractive index of the second lens element E2 is N2, the refractive index of the third lens element E3 is N3, and the following condition is satisfied: (N2+N3)/2=1.602.

In the 1st embodiment, the curvature radius of the image-side surface of the sixth lens element E6 is R12, the curvature radius of the object-side surface of the seventh lens element E7 is R13, and the following condition is satisfied: (R12+R13)/(R12−R13)=0.27.

In the 1st embodiment, the curvature radius of the object-side surface of the seventh lens element E7 is R13, the curvature radius of the image-side surface of the seventh lens element E7 is R14, and the following condition is satisfied: (R13−R14)/(R13+R14)=0.14.

In the 1st embodiment, the curvature radius of the object-side surface of the third lens element E3 is R5, the curvature radius of the image-side surface of the third lens element E3 is R6, and the following condition is satisfied: (R5+R6)/(R5−R6)=0.16.

In the 1st embodiment, the axial distance between the fourth lens element E4 and the fifth lens element E5 is T45, the axial distance between the fifth lens element E5 and the sixth lens element E6 is T56, the axial distance between the sixth lens element E6 and the seventh lens element E7 is T67, the sum of all axial distances between each of adjacent lens elements of the imaging optical lens assembly is ΣAT, and the following condition is satisfied: (T45+T56+T67)/ΣAT=0.21.

In the 1st embodiment, the focal length of the imaging optical lens assembly 1 is f, the focal length of the first lens element E1 is f1, and the following condition is satisfied: f/f1=−0.56.

In the 1st embodiment, the focal length of the imaging optical lens assembly 1 is f, the composite focal length of the first lens element E1 and the second lens element E2 is f12, and the following condition is satisfied: f/f12=−0.33.

In the 1st embodiment, the focal length of the imaging optical lens assembly 1 is f, the composite focal length of the first lens element E1, the second lens element E2, the third lens element E3 and the fourth lens element E4 is f1234, and the following condition is satisfied: f/f1234=0.60.

In the 1st embodiment, the focal length of the imaging optical lens assembly 1 is f, a focal length of the second lens element E2 is f2, and the following condition is satisfied: f/f2=0.23.

In the 1st embodiment, the focal length of the imaging optical lens assembly 1 is f, the composite focal length of the third lens element E3, the fourth lens element E4 and the fifth lens element E5 is f345, and the following condition is satisfied: f/f345=0.53.

In the 1st embodiment, the focal length of the imaging optical lens assembly 1 is f, the focal length of the fifth lens element E5 is f5, and the following condition is satisfied: f/f5=−0.27.

In the 1st embodiment, the focal length of the imaging optical lens assembly 1 is f, the composite focal length of the fifth lens element E5, the sixth lens element E6 and the seventh lens element E7 is f567, and the following condition is satisfied: f/f567=0.38.

In the 1st embodiment, the focal length of the imaging optical lens assembly 1 is f, the composite focal length of the sixth lens element E6 and the seventh lens element E7 is f67, and the following condition is satisfied: f/f67=0.65.

In the 1st embodiment, the focal length of the imaging optical lens assembly 1 is f, the focal length of the seventh lens element E7 is f, and the following condition is satisfied: f/f7=−0.15.

In the 1st embodiment, the focal length of the imaging optical lens assembly 1 is f, the curvature radius of the object-side surface of the first lens element E1 is R1, and the following condition is satisfied: f/R1=−1.60.

In the 1st embodiment, the focal length of the imaging optical lens assembly 1 is f, the curvature radius of the image-side surface of the sixth lens element E6 is R12, and the following condition is satisfied: f/R12=−1.29.

In the 1st embodiment, the focal length of the imaging optical lens assembly 1 is f, the curvature radius of the object-side surface of the seventh lens element E7 is R13, and the following condition is satisfied: f/R13=2.25.

In the 1st embodiment, the maximum value among all axial distances between each of adjacent lens elements of the imaging optical lens assembly 1 is MaxAT, the sum of all axial distances between each of adjacent lens elements of the imaging optical lens assembly 1 is ΣAT, and the following condition is satisfied: MaxAT/ΣAT=0.33.

In the 1st embodiment, the refractive index of the second lens element E2 is N2, and the following condition is satisfied: N2=1.660.

In the 1st embodiment, the curvature radius of the object-side surface of the first lens element E1 is R1, the curvature radius of the image-side surface of the first lens element E1 is R2, and the following condition is satisfied: R1/R2=0.32.

In the 1st embodiment, the imaging optical lens assembly 1 further includes an aperture stop, the axial distance between the aperture stop and the image surface is SL, the axial distance between the object-side surface of the first lens element E1 and the image surface is TL, and the following condition is satisfied: SL/TL=0.72.

In the 1st embodiment, the axial distance between the object-side surface of the first lens element E1 and the image-side surface of the seventh lens element E7 is TD, the axial distance between the object-side surface of the first lens element E1 and the image surface is TL, and the following condition is satisfied: TD/TL=0.76.

2nd Embodiment

Figure 2A:
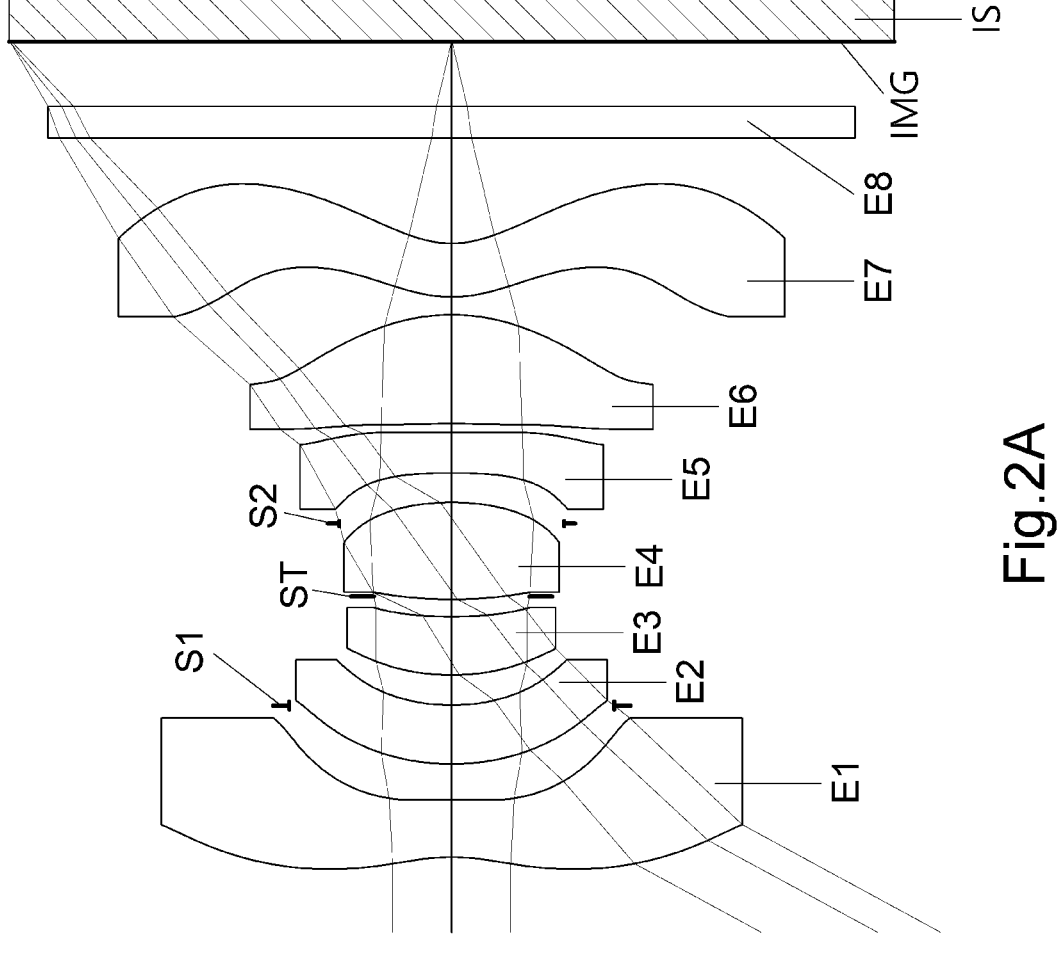
FIG. 2A is a schematic view of an imaging apparatus according to the 2nd embodiment of the present disclosure.
Figure 2B:
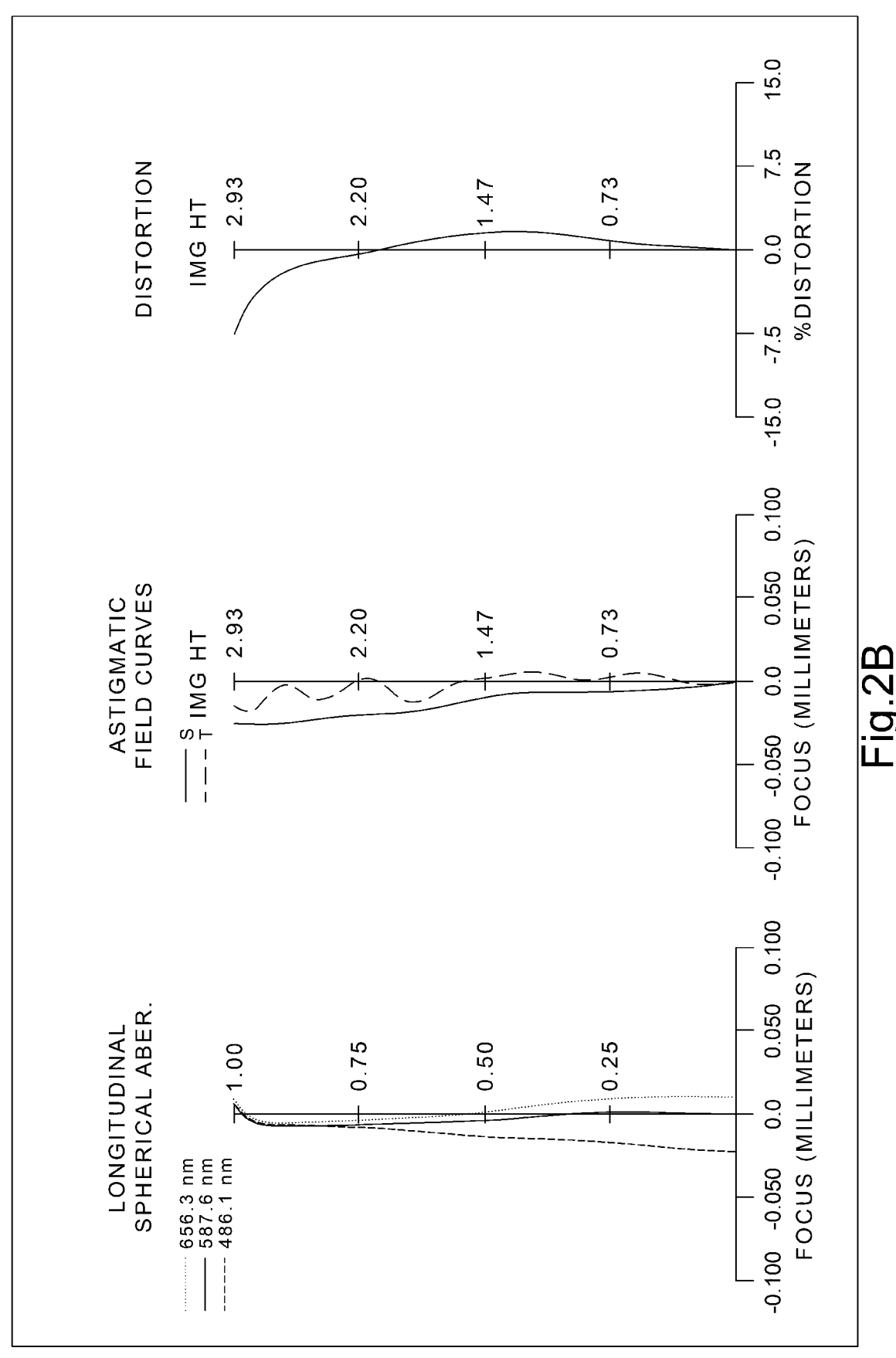
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an imaging optical lens assembly 2 of the present disclosure and an image sensor IS. The imaging optical lens assembly 2 includes, in order from an object side to an image side along an optical path, a first lens element E1, a stop S1, a second lens element E2, a third lens element E3, an aperture stop ST, a fourth lens element E4, a stop S2, a fifth lens element E5, a sixth lens element E6, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has negative refractive power and is made of plastic material. The second lens element E2 has an object-side surface being convex in a paraxial region thereof and having one inflection point on the object-side surface, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being concave in a paraxial region thereof. Both the object-side surface and the image-side surface are aspheric.

The fourth lens element E4 has positive refractive power and is made of plastic material. The fourth lens element E4 has an object-side surface being convex in a paraxial region thereof and having one inflection point on the object-side surface, and an image-side surface being convex in a paraxial region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point on the object-side surface, and an image-side surface being convex in a paraxial region thereof and having three inflection points and two critical points on the image-side surface. Both the object-side surface and the image-side surface are aspheric.

The sixth lens element E6 has positive refractive power and is made of plastic material. The sixth lens element E6 has an object-side surface being concave in a paraxial region thereof and having four inflection points on the object-side surface, and an image-side surface being convex in a paraxial region thereof and having two inflection points on the image-side surface. Both the object-side surface and the image-side surface are aspheric.

The seventh lens element E7 has negative refractive power and is made of plastic material. The seventh lens element E7 has an object-side surface being convex in a paraxial region thereof and having two inflection points and one critical point on the object-side surface, and an image-side surface being concave in a paraxial region thereof and having one inflection point and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 2. The image sensor IS is disposed on or near the image surface IMG.

The detailed optical data of the 2nd embodiment are shown in TABLE 2A, and the aspheric surface data are shown in TABLE 2B.

TABLE 2A (2nd Embodiment)
f = 1.72 mm, Fno = 2.20, HFOV = 61.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.1973 | (ASP) | 0.380 | Plastic | 1.545 | 56.1 | −3.02 |
| 2 | | −4.8914 | (ASP) | 0.625 | | | | |
| 3 | Stop | Plano | | −0.387 | | | | |
| 4 | Lens 2 | 1.6501 | (ASP) | 0.390 | Plastic | 1.686 | 18.4 | −15.13 |
| 5 | | 1.2869 | (ASP) | 0.200 | | | | |
| 6 | Lens 3 | 1.4744 | (ASP) | 0.387 | Plastic | 1.587 | 28.3 | 5.02 |
| 7 | | 2.6614 | (ASP) | 0.135 | | | | |
| 8 | Ape. Stop | Plano | | −0.020 | | | | |
| 9 | Lens 4 | 2.8517 | (ASP) | 0.644 | Plastic | 1.544 | 56.0 | 2.07 |
| 10 | | −1.7126 | (ASP) | −0.140 | | | | |
| 11 | Stop | Plano | | 0.335 | | | | |
| 12 | Lens 5 | −4.9707 | (ASP) | 0.270 | Plastic | 1.686 | 18.4 | −13.67 |
| 13 | | −10.8130 | (ASP) | 0.060 | | | | |
| 14 | Lens 6 | −2.6079 | (ASP) | 0.722 | Plastic | 1.544 | 56.0 | 4.08 |
| 15 | | −1.3158 | (ASP) | 0.117 | | | | |
| 16 | Lens 7 | 0.8407 | (ASP) | 0.357 | Plastic | 1.544 | 56.0 | −19.29 |
| 17 | | 0.6619 | (ASP) | 0.700 | | | | |
| 18 | Filter | Plano | | 0.210 | Glass | 1.517 | 64.2 | — |
| 19 | | Plano | | 0.429 | | | | |
| 20 | Image Surface | Plano | | — | | | | |

Remark: Reference wavelength is d-line 587.6 nm.
* The effective radius of the stop on Surface 3 is 1.078 mm.
* The effective radius of the stop on Surface 11is 0.746 mm.

TABLE 2B

Aspheric Coefficient

| Surface # | 1 | 2 | 4 | 5 |
|---|---|---|---|---|
| K= | −1.00000000E+00 | 7.93259000E+00 | −4.97750000E−01 | 5.62074000E−01 |
| A4= | 1.05827112E+00 | 1.17769673E+00 | 2.83332674E−01 | 4.58713065E−02 |
| A6= | −2.04001004E+00 | −9.28797207E−01 | −1.20448238E+00 | −2.60273116E−01 |
| A8= | 3.23741779E+00 | −6.27125908E+00 | 4.14069976E+00 | 5.86250293E+00 |
| A10= | −3.94779102E+00 | 3.50398695E+01 | −1.06568332E+01 | −4.30761853E+01 |
| A12= | 3.62098994E+00 | −9.53600541E+01 | 1.99337810E+01 | 1.87073382E+02 |
| A14= | −2.48178405E+00 | 1.63140399E+02 | −2.45240117E+01 | −4.84209384E+02 |
| A16= | 1.26634256E+00 | −1.83992719E+02 | 1.84088802E+01 | 7.29788663E+02 |
| A18= | −4.77475766E−01 | 1.36557402E+02 | −7.64954549E+00 | −5.98378943E+02 |
| A20= | 1.30949654E−01 | −6.41494196E+01 | 1.34722435E+00 | 2.08367736E+02 |
| A22= | −2.53559277E−02 | 1.72618431E+01 | | |
| A24= | 3.28139511E−03 | −2.02251267E+00 | | |
| A26= | −2.54432707E−04 | | | |
| A28= | 8.93128946E−06 | | | |

TABLE 2B-continued

| | | Aspheric Coefficient | | |
|---|---|---|---|---|
| Surface # | 6 | 7 | 9 | 10 |
| K= | 1.80978000E−01 | −5.20441000E+00 | 0.00000000E+00 | 3.28466000E+00 |
| A4= | −7.55560632E−03 | 1.67348977E−01 | 2.41009383E−02 | −1.91336027E−01 |
| A6= | 1.09418701E+00 | 2.76484680E−01 | 4.68340274E−01 | −3.56178778E−01 |
| A8= | −1.12230107E+01 | −6.99224273E+00 | −4.57775936E+00 | 4.90982512E+00 |
| A10= | 7.03982335E+01 | 7.97368843E+01 | −3.31952584E+01 | −3.37167949E+01 |
| A12= | −2.78299418E+02 | −4.82176021E+02 | 8.62498145E+02 | 1.33078348E+02 |
| A14= | 6.85778160E+02 | 1.63800600E+03 | −6.78233674E+03 | −3.31240600E+02 |
| A16= | −1.03243054E+03 | −2.98603727E+03 | 2.65575297E+04 | 4.97169651E+02 |
| A18= | 8.66610563E+02 | 2.43876768E+03 | −5.24820011E+04 | −3.96070598E+02 |
| A20= | −3.08002202E+02 | −3.94877980E+02 | 4.16165340E+04 | 1.17129778E+02 |
| A22= | | | | |
| A24= | | | | |
| A26= | | | | |
| A28= | | | | |

| Surface # | 12 | 13 | 14 | 15 |
|---|---|---|---|---|
| K= | 0.00000000E+00 | 4.89563000E+01 | −3.66700000E−01 | −9.40288000E−01 |
| A4= | −2.06989172E−01 | 1.26263406E+00 | 1.96546970E+00 | −6.76750903E−02 |
| A6= | −3.93682068E+00 | −1.07848195E+01 | −1.11608132E+01 | 4.23454992E−01 |
| A8= | 2.91040973E+01 | 4.74827799E+01 | 3.90237348E+01 | −9.95021800E−01 |
| A10= | −1.21438392E+02 | −1.36181108E+02 | −9.12680689E+01 | 1.81076455E+00 |
| A12= | 2.97740663E+02 | 2.66163229E+02 | 1.46002804E+02 | −4.12806419E+00 |
| A14= | −3.97036488E+02 | −3.57935232E+02 | −1.60841739E+02 | 9.91098262E+00 |
| A16= | 1.50287950E+02 | 3.27252124E+02 | 1.21540340E+02 | −1.66414497E+01 |
| A18= | 2.79362289E+02 | −1.95063003E+02 | −6.16485798E+01 | 1.76084724E+01 |
| A20= | −3.51628951E+02 | 6.85707727E+01 | 1.99285787E+01 | −1.15590936E+01 |
| A22= | 1.16530651E+02 | −1.07953200E+01 | −3.66846166E+00 | 4.57442974E+00 |
| A24= | | | 2.86857551E−01 | −1.00067771E+00 |
| A26= | | | | 9.30503644E−02 |
| A28= | | | | |

| Surface # | 16 | 17 |
|---|---|---|
| K= | −9.92804000E−01 | −1.00000000E+00 |
| A4= | −7.77127695E−01 | −9.05880315E−01 |
| A6= | 8.61930972E−01 | 1.11297988E+00 |
| A8= | −1.05162021E+00 | −1.30559366E+00 |
| A10= | 1.00781206E+00 | 1.24911921E+00 |
| A12= | −6.16801835E−01 | −9.09350942E−01 |
| A14= | 1.91709243E−01 | 4.91803318E−01 |
| A16= | 4.24404670E−03 | −1.96162671E−01 |
| A18= | −2.72085359E−02 | 5.72823964E−02 |
| A20= | 1.05342206E−02 | −1.20617145E−02 |
| A22= | −1.99201087E−03 | 1.77858202E−03 |
| A24= | 1.95050188E−04 | −1.73941062E−04 |
| A26= | −7.91889052E−06 | 1.01189051E−05 |
| A28= | | −2.64707998E−07 |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 2A and TABLE 2B and satisfy the conditions stated in TABLE 2C below.

TABLE 2C

| | | | |
|---|---|---|---|
| f [mm] | 1.72 | f/f345 | 0.94 |
| Fno | 2.20 | f/f5 | −0.13 |
| HFOV [deg.] | 61.5 | f/f567 | 0.29 |
| (CT1 + T12)/f | 0.36 | f/f67 | 0.41 |
| (N2 + N3)/2 | 1.637 | f/f7 | −0.09 |
| (R12 + R13)/(R12 − R13) | 0.22 | f/R1 | −1.44 |
| (R13 − R14)/(R13 + R14) | 0.12 | f/R12 | −1.31 |
| (R5 + R6)/(R5 − R6) | −3.48 | f/R13 | 2.05 |
| (T45 + T56 + T67)ΣAT | 0.40 | Max(AT)/ΣAT | 0.26 |
| f/f1 | −0.57 | N2 | 1.686 |
| f/f12 | −0.78 | R1/R2 | 0.24 |
| f/f1234 | 0.71 | SL/TL | 0.68 |
| f/f2 | −0.11 | TD/TL | 0.75 |

3rd Embodiment

Figure 3A:
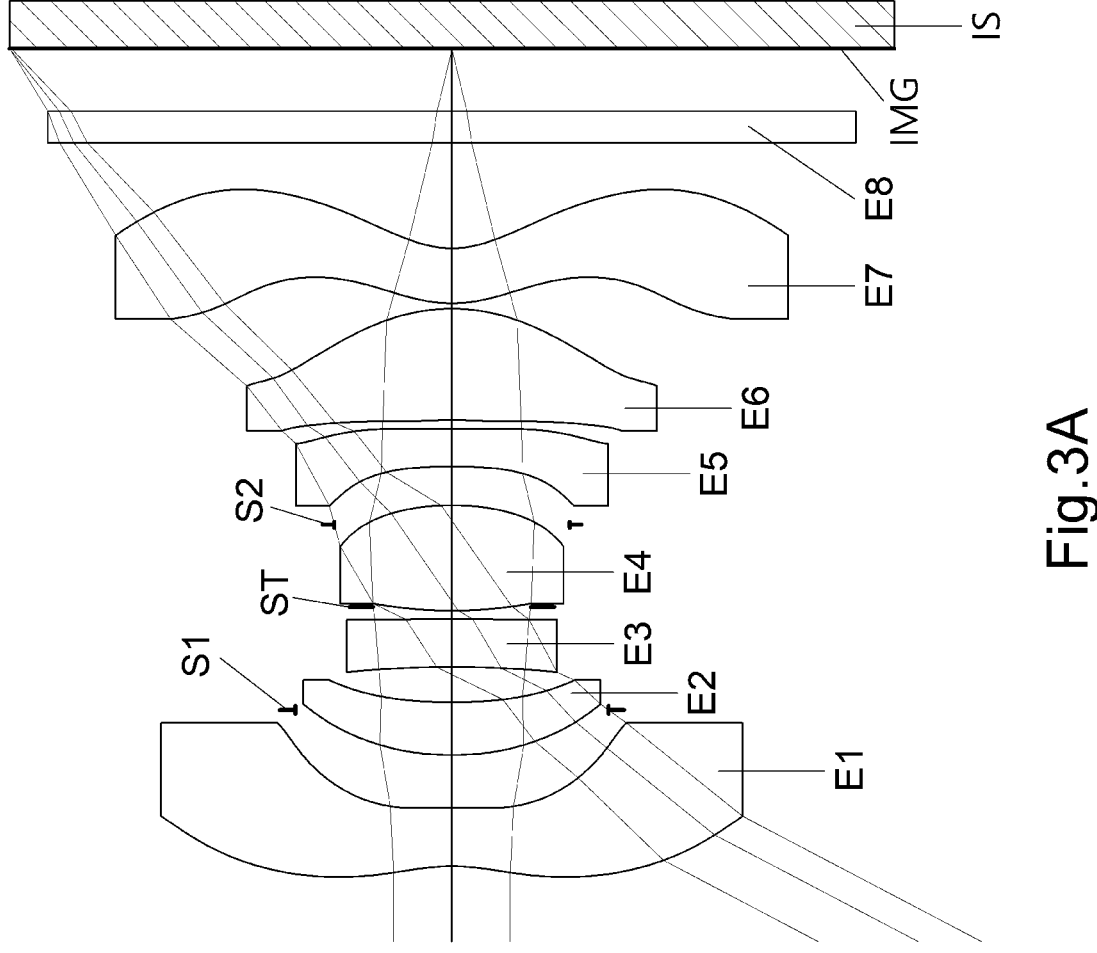
FIG. 3A is a schematic view of an imaging apparatus according to the 3rd embodiment of the present disclosure.
Figure 3B:
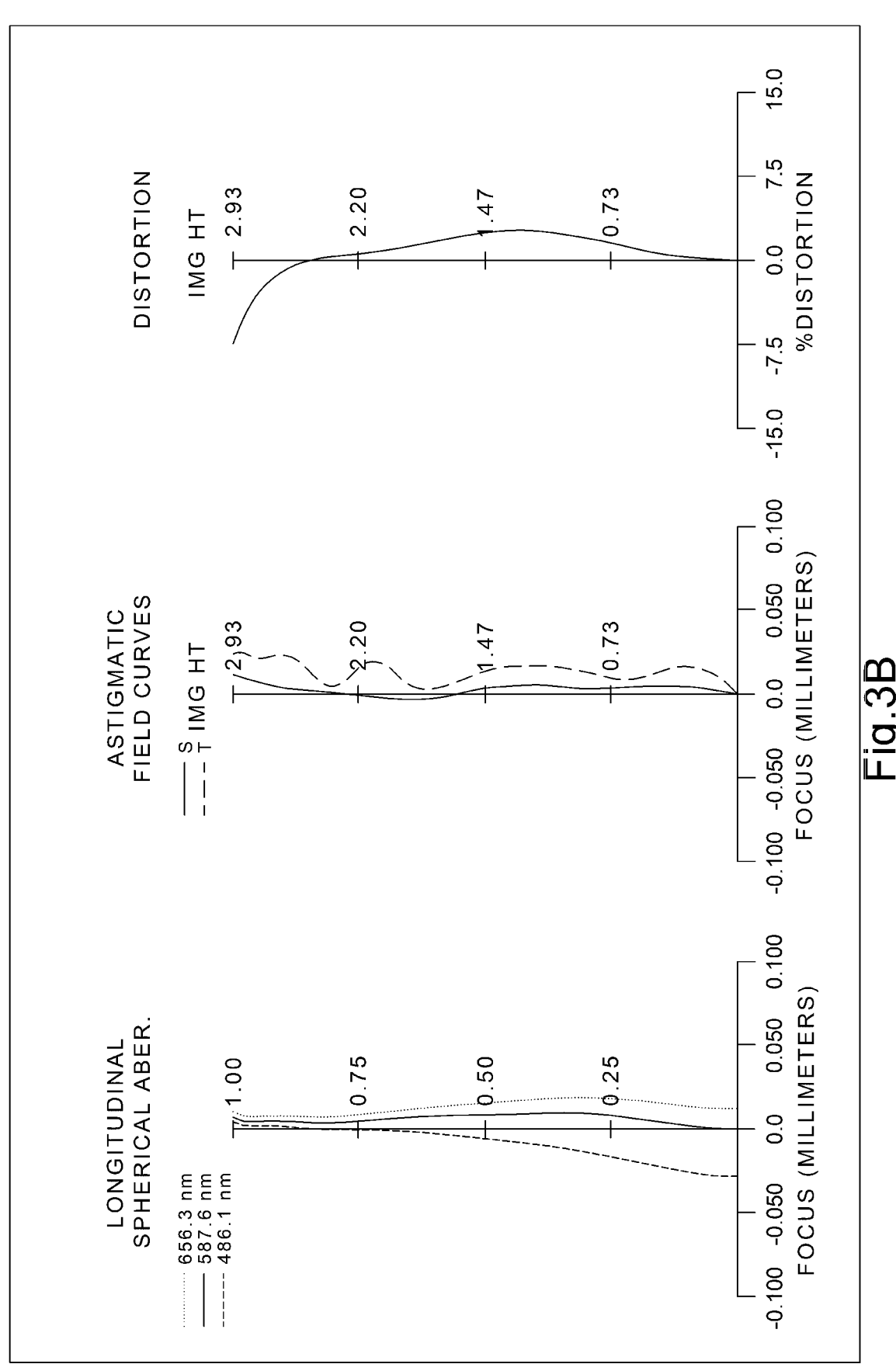
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an imaging optical lens assembly 3 of the present disclosure and an image sensor IS. The imaging optical lens assembly 3 includes, in order from an object side to an image side along an optical path, a first lens element E1, a stop S1, a second lens element E2, a third lens element E3, an aperture stop ST, a fourth lens element E4, a stop S2, a fifth lens element E5, a sixth lens element E6, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has positive refractive power and is made of plastic material. The second lens element E2 has an object-side surface being convex in a paraxial region thereof and having one inflection point on the object-side surface, and an image-side surface being concave in a paraxial region thereof and having one inflection point on the image-side surface. Both the object-side surface and the image-side surface are aspheric.

The third lens element E3 has negative refractive power and is made of plastic material. The third lens element E3 has an object-side surface being concave in a paraxial region thereof, and an image-side surface being convex in a paraxial region thereof and having one inflection point and one critical point on the image-side surface. Both the object-side surface and the image-side surface are aspheric.

The fourth lens element E4 has positive refractive power and is made of plastic material. The fourth lens element E4 has an object-side surface being convex in a paraxial region thereof and having one inflection point on the object-side surface, and an image-side surface being convex in a paraxial region thereof. Both the object-side surface and the image-side surface are aspheric.

The fifth lens element E5 has negative refractive power and is made of plastic material. The fifth lens element E5 has an object-side surface being concave in a paraxial region thereof, and an image-side surface being convex in a paraxial region thereof and having three inflection points and two critical points on the image-side surface. Both the object-side surface and the image-side surface are aspheric.

The sixth lens element E6 has positive refractive power and is made of plastic material. The sixth lens element E6 has an object-side surface being concave in a paraxial region thereof and having two inflection points on the object-side surface, and an image-side surface being convex in a paraxial region thereof and having two inflection points on the image-side surface. Both the object-side surface and the image-side surface are aspheric.

The seventh lens element E7 has negative refractive power and is made of plastic material. The seventh lens element E7 has an object-side surface being convex in a paraxial region thereof and having two inflection points and one critical point on the object-side surface, and an image-side surface being concave in a paraxial region thereof and having one inflection point and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 3. The image sensor IS is disposed on or near the image surface IMG.

The detailed optical data of the 3rd embodiment are shown in TABLE 3A, and the aspheric surface data are shown in TABLE 3B.

TABLE 3A

|  | | | | | | | |
|---|---|---|---|---|---|---|---|
| (3rd Embodiment) | | | | | | | |
| f = 1.66 mm, Fno = 2.15, HFOV = 62.3 deg. | | | | | | | |
| Surface # | | Curvature Radius | | Thickness | Material | Index | Abbe # | Focal Length |
| 0 | Object | Plano | | Infinity | | | | |
| 1 | Lens 1 | −1.2471 | (ASP) | 0.387 | Plastic | 1.545 | 56.1 | −3.07 |
| 2 | | −5.4285 | (ASP) | 0.650 | | | | |
| 3 | Stop | Plano | | −0.299 | | | | |
| 4 | Lens 2 | 1.9388 | (ASP) | 0.350 | Plastic | 1.656 | 21.3 | 6.51 |
| 5 | | 3.2965 | (ASP) | 0.234 | | | | |
| 6 | Lens 3 | −6.4434 | (ASP) | 0.319 | Plastic | 1.686 | 18.4 | −31.34 |
| 7 | | −9.3861 | (ASP) | 0.079 | | | | |
| 8 | Ape. Stop | Plano | | −0.024 | | | | |
| 9 | Lens 4 | 2.9902 | (ASP) | 0.699 | Plastic | 1.544 | 56.0 | 2.15 |
| 10 | | −1.7584 | (ASP) | −0.128 | | | | |
| 11 | Stop | Plano | | 0.385 | | | | |
| 12 | Lens 5 | −4.5228 | (ASP) | 0.250 | Plastic | 1.686 | 18.4 | −12.06 |
| 13 | | −10.2025 | (ASP) | 0.059 | | | | |
| 14 | Lens 6 | −2.4835 | (ASP) | 0.740 | Plastic | 1.544 | 56.0 | 3.74 |
| 15 | | −1.2350 | (ASP) | 0.035 | | | | |
| 16 | Lens 7 | 0.8569 | (ASP) | 0.366 | Plastic | 1.544 | 56.0 | −13.37 |
| 17 | | 0.6512 | (ASP) | 0.700 | | | | |
| 18 | Filter | Plano | | 0.210 | Glass | 1.517 | 64.2 | — |
| 19 | | Plano | | 0.414 | | | | |

TABLE 3A-continued

| (3rd Embodiment) f = 1.66 mm, Fno = 2.15, HFOV = 62.3 deg. | | | | | | |
|---|---|---|---|---|---|---|
| Surface # | Curvature Radius | Thickness | Material | Index | Abbe # | Focal Length |
| 20 | Image Surface | Plano | — | | | |

Remark: Reference wavelength is d-line 587.6 nm.
* The effective radius of the stop on Surface 3 is 1.038 mm.
* The effective radius of the stop on Surface 11is 0.780 mm.

TABLE 3B

| Aspheric Coefficient | | | | |
|---|---|---|---|---|
| Surface # | 1 | 2 | 4 | 5 |
| K= | −1.00000000E+00 | 3.09670000E+00 | −5.30285000E−01 | 4.27142000E+00 |
| A4= | 1.04139153E+00 | 1.14914758E+00 | 3.09489221E−01 | 1.69352333E−01 |
| A6= | −1.98971659E+00 | −8.80849292E−01 | −1.09373679E+00 | −7.58080854E−01 |
| A8= | 3.17447441E+00 | −5.74227750E+00 | 2.79766764E+00 | 3.58378681E+00 |
| A10= | −3.91880035E+00 | 3.31972628E+01 | −5.12897850E+00 | −1.08296270E+01 |
| A12= | 3.64681946E+00 | −9.44328442E+01 | 6.56005387E+00 | 2.09465131E+01 |
| A14= | −2.53548383E+00 | 1.69629099E+02 | −4.70728238E+00 | −2.08391579E+01 |
| A16= | 1.31098973E+00 | −2.01159381E+02 | 8.64078818E−01 | −6.50348832E−01 |
| A18= | −5.00238522E−01 | 1.56863716E+02 | 9.08261549E−01 | 2.03034819E+01 |
| A20= | 1.38657043E−01 | −7.71824002E+01 | −4.27293010E−01 | −1.25135748E+01 |
| A22= | −2.71038467E−02 | 2.16428414E+01 | | |
| A24= | 3.53769221E−03 | −2.62567209E+00 | | |
| A26= | −2.76466830E−04 | | | |
| A28= | 9.77671532E−06 | | | |
| Surface # | 6 | 7 | 9 | 10 |
| K= | −3.18044000E+01 | 5.66473000E+01 | 0.00000000E+00 | 2.76163000E+00 |
| A4= | 6.16897689E−02 | 2.64554550E−01 | 1.70356729E−01 | −1.53606408E−01 |
| A6= | −4.40360103E−01 | −1.30984657E+00 | −5.38719811E−01 | −2.38957598E−01 |
| A8= | 3.29472443E+00 | 1.02331448E+01 | −2.71788229E+00 | 2.10956002E+00 |
| A10= | −1.96022566E+01 | −7.49161709E+01 | 1.53244882E+00 | −1.14003661E+01 |
| A12= | 7.44283714E+01 | 4.00578530E+02 | 8.06894775E+00 | 3.31903005E+01 |
| A14= | −1.77474684E+02 | −1.40158939E+03 | −1.02605897E+03 | −6.00217827E+01 |
| A16= | 2.58939758E+02 | 3.05379762E+03 | 3.71498414E+03 | 5.94914839E+01 |
| A18= | −2.11301548E+02 | −3.77701586E+03 | −5.61144552E+03 | −1.74891516E+01 |
| A20= | 7.36314457E+01 | 2.02427235E+03 | 2.65390127E+03 | −1.24077779E+01 |
| A22= | | | | |
| A24= | | | | |
| A26= | | | | |
| A28= | | | | |
| Surface # | 12 | 13 | 14 | 15 |
| K= | 0.00000000E+00 | 6.57263000E+01 | −1.92153000E−01 | −9.51292000E−01 |
| A4= | −2.55961369E−01 | 1.26853197E+00 | 2.08899898E+00 | −6.30645006E−02 |
| A6= | −2.22164893E+00 | −1.03316284E+01 | −1.15864566E+01 | 1.75598125E−01 |
| A8= | 9.26319450E+00 | 4.23828274E+01 | 3.91146756E+01 | 8.99880501E−01 |
| A10= | 1.25924648E+01 | −1.10884847E+02 | −8.71858596E+01 | −6.10499520E+00 |
| A12= | −2.72051244E+02 | 1.94163687E+02 | 1.32249858E+02 | 1.64768948E+01 |
| A14= | 1.19014571E+03 | −2.29794984E+02 | −1.38506529E+02 | −2.48366383E+01 |
| A16= | −2.74044017E+03 | 1.81516590E+02 | 1.00505580E+02 | 2.24681670E+01 |
| A18= | 3.61029420E+03 | −9.18837616E+01 | −5.01020621E+01 | −1.21235151E+01 |
| A20= | −2.56498675E+03 | 2.71050454E+01 | 1.67159274E+01 | 3.53558942E+00 |
| A22= | 7.62584422E+02 | −3.57288044E+00 | −3.48672340E+00 | −3.29627811E−01 |
| A24= | | | 3.59739363E−01 | −7.89544439E−02 |
| A26= | | | | 1.68565599E−02 |
| A28= | | | | |
| Surface # | 16 | 17 | | |
| K= | −9.83654000E−01 | −1.00000000E+00 | | |
| A4= | −8.06075580E−01 | −8.94204832E−01 | | |
| A6= | 9.01577147E−01 | 9.48111039E−01 | | |
| A8= | −1.39387079E+00 | −9.37521504E−01 | | |
| A10= | 1.98797979E+00 | 7.99851795E−01 | | |
| A12= | −1.97154053E+00 | −5.47292126E−01 | | |
| A14= | 1.29275181E+00 | 2.85639667E−01 | | |
| A16= | −5.65554570E−01 | −1.11071517E−01 | | |

TABLE 3B-continued

| Aspheric Coefficient | | |
|---|---|---|
| A18= | 1.66415452E-01 | 3.17375053E-02 |
| A20= | -3.26103465E-02 | -6.54952112E-03 |
| A22= | 4.08837440E-03 | 9.47249281E-04 |
| A24= | -2.97115683E-04 | -9.08791244E-05 |
| A26= | 9.52929894E-06 | 5.18388076E-06 |
| A28= | | -1.32808557E-07 |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 3A and TABLE 3B and satisfy the conditions stated in TABLE 3C below.

TABLE 3C

| | | | |
|---|---|---|---|
| f[mm] | 1.66 | f/f345 | 0.62 |
| Fno | 2.15 | f/f5 | -0.14 |
| HFOV [deg.] | 62.3 | f/f567 | 0.27 |
| (CT1 + T12)/f | 0.44 | f/f67 | 0.40 |
| (N2 + N3)/2 | 1.671 | f/f7 | -0.12 |
| (R12 + R13)/(R12 - R13) | 0.18 | f/R1 | -1.33 |
| (R13 - R14)/(R13 + R14) | 0.14 | f/R12 | -1.34 |
| (R5 + R6)/(R5 - R6) | -5.38 | f/R13 | 1.94 |
| (T45 + T56 + T67)ΣAT | 0.35 | Max(AT)/ΣAT | 0.35 |
| f/f1 | -0.54 | N2 | 1.656 |
| f/f12 | -0.25 | R1/R2 | 0.23 |
| f/f1234 | 0.74 | SL/TL | 0.68 |
| f/f2 | 0.25 | TD/TL | 0.76 |

4th Embodiment

Figure 4A:
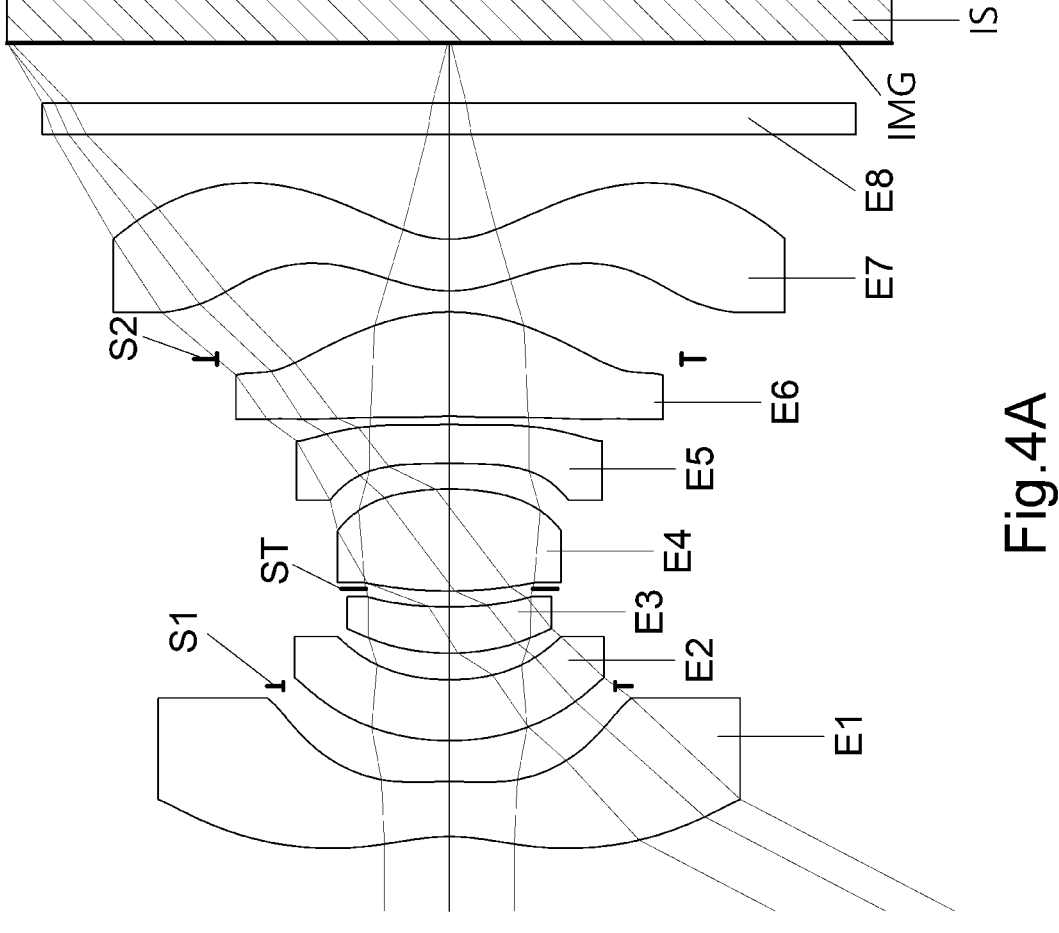
FIG. 4A is a schematic view of an imaging apparatus according to the 4th embodiment of the present disclosure.
Figure 4B:
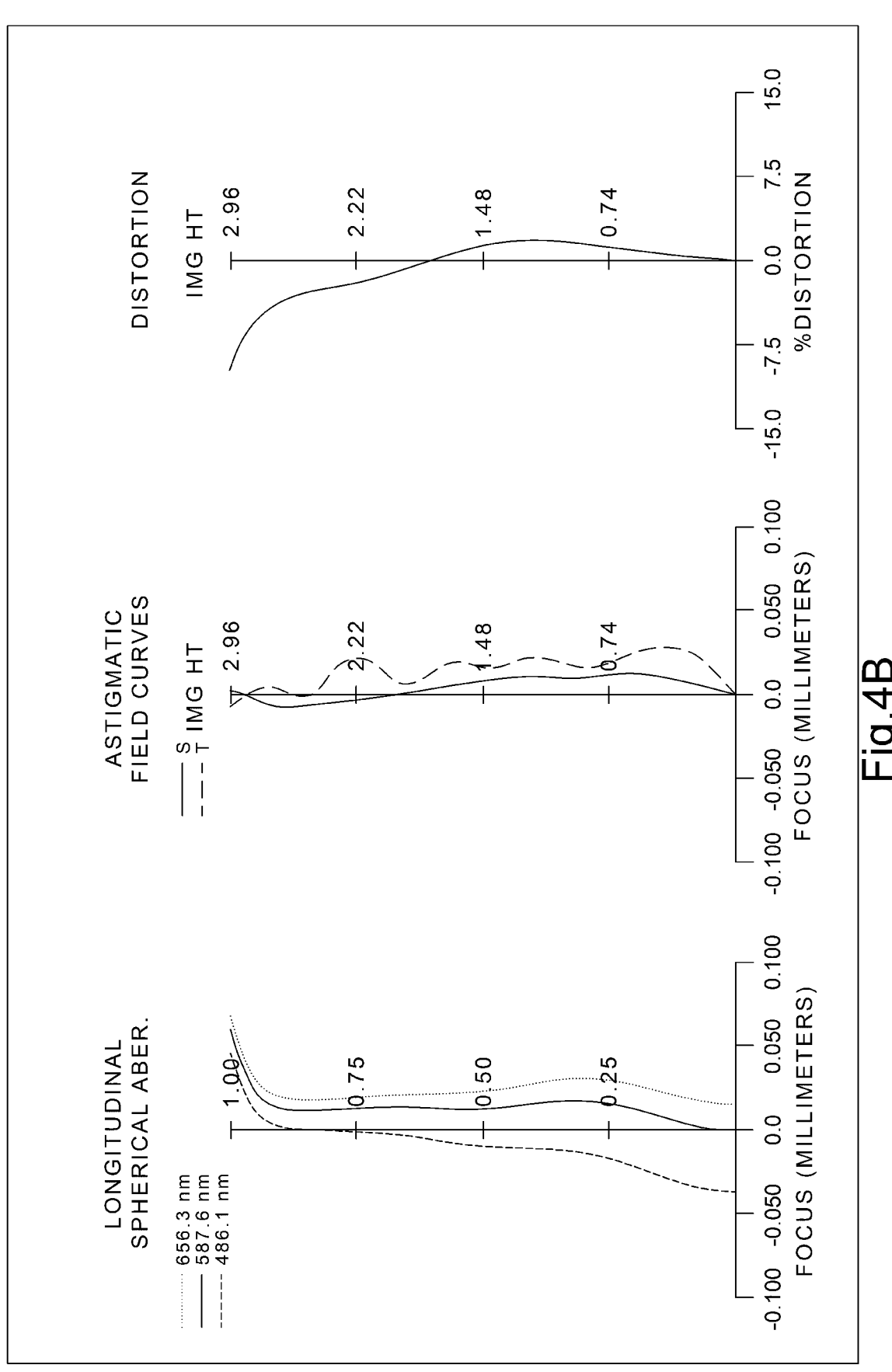
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an imaging optical lens assembly 4 of the present disclosure and an image sensor IS. The imaging optical lens assembly 4 includes, in order from an object side to an image side along an optical path, a first lens element E1, a stop S1, a second lens element E2, a third lens element E3, an aperture stop ST, a fourth lens element E4, a fifth lens element E5, a sixth lens element E6, a stop S2, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has negative refractive power and is made of glass material. The second lens element E2 has an object-side surface being convex in a paraxial region thereof and having one inflection point on the object-side surface, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof and having one inflection point on the object-side surface, and an image-side surface being concave in a paraxial region thereof. Both the object-side surface and the image-side surface are aspheric.

The fourth lens element E4 has positive refractive power and is made of plastic material. The fourth lens element E4 has an object-side surface being convex in a paraxial region thereof and having one inflection point on the object-side surface, and an image-side surface being convex in a paraxial region thereof. Both the object-side surface and the image-side surface are aspheric.

The fifth lens element E5 has positive refractive power and is made of plastic material. The fifth lens element E5 has an object-side surface being concave in a paraxial region thereof and having one inflection point on the object-side surface, and an image-side surface being convex in a paraxial region thereof and having three inflection points on the image-side surface. Both the object-side surface and the image-side surface are aspheric.

The sixth lens element E6 has positive refractive power and is made of plastic material. The sixth lens element E6 has an object-side surface being concave in a paraxial region thereof and having four inflection points and two critical points on the object-side surface, and an image-side surface being convex in a paraxial region thereof and having two inflection points on the image-side surface. Both the object-side surface and the image-side surface are aspheric.

The seventh lens element E7 has negative refractive power and is made of plastic material. The seventh lens element E7 has an object-side surface being convex in a paraxial region thereof and having two inflection points and one critical point on the object-side surface, and an image-side surface being concave in a paraxial region thereof and having one inflection point and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 4. The image sensor IS is disposed on or near the image surface IMG.

The detailed optical data of the 4th embodiment are shown in TABLE 4A, and the aspheric surface data are shown in TABLE 4B.

TABLE 4A (4th Embodiment)
f = 1.71 mm, Fno = 1.97, HFOV = 62.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.2042 | (ASP) | 0.366 | Plastic | 1.545 | 56.1 | −3.13 |
| 2 | | −4.5507 | (ASP) | 0.642 | | | | |
| 3 | Stop | Plano | | −0.366 | | | | |
| 4 | Lens 2 | 1.6811 | (ASP) | 0.407 | Glass | 1.946 | 17.9 | −14.56 |
| 5 | | 1.3219 | (ASP) | 0.178 | | | | |
| 6 | Lens 3 | 1.5490 | (ASP) | 0.310 | Plastic | 1.639 | 23.5 | 5.31 |
| 7 | | 2.6276 | (ASP) | 0.122 | | | | |
| 8 | Ape. Stop | Plano | | −0.016 | | | | |
| 9 | Lens 4 | 2.8783 | (ASP) | 0.683 | Plastic | 1.544 | 56.0 | 2.32 |
| 10 | | −2.0521 | (ASP) | 0.171 | | | | |
| 11 | Lens 5 | −11.6650 | (ASP) | 0.260 | Plastic | 1.686 | 18.4 | 20,69 |
| 12 | | −6.4612 | (ASP) | 0.057 | | | | |
| 13 | Lens 6 | −2.5788 | (ASP) | 0.698 | Plastic | 1.544 | 56.0 | 4.57 |
| 14 | | −1.3872 | (ASP) | −0.314 | | | | |
| 15 | Stop | Plano | | 0.456 | | | | |
| 16 | Lens 7 | 0.8410 | (ASP) | 0.345 | Plastic | 1.544 | 56.0 | −17.52 |
| 17 | | 0.6611 | (ASP) | 0.700 | | | | |
| 18 | Filter | Plano | | 0.210 | Glass | 1.517 | 64.2 | — |
| 19 | | Plano | | 0.403 | | | | |
| 20 | Image Surface | Plano | | — | | | | |

Remark: Reference wavelength is 587.6 nm.
*The effective radius of the stop on Surface 3 is 1.110 mm.
*The effective radius of the stop on Surface 15 is 1.554 mm.

TABLE 4B

Aspheric Coefficient

| Surface # | 1 | 2 | 4 | 5 |
|---|---|---|---|---|
| K= | −1.00000000E+00 | 7.02909000E+00 | −4.93035000E−01 | 7.29991000E−01 |
| A4= | 1.06234433E+00 | 1.17800861E+00 | 2.43848566E−01 | 1.21882044E−01 |
| A6= | −2.04185291E+00 | −1.12577305E+00 | −1.14745891E+00 | −9.51995540E−01 |
| A8= | 3.23195089E+00 | −4.50800485E+00 | 4.57698444E+00 | 1.15258109E+01 |
| A10= | −3.92835354E+00 | 2.68224891E+01 | −1.26244689E+01 | −7.18380912E+01 |
| A12= | 3.59019049E+00 | −7.11227517E+01 | 2.38528413E+01 | 2.84794531E+02 |
| A14= | −2.45203718E+00 | 1.16214056E+02 | −2.91454697E+01 | −7.00310830E+02 |
| A16= | 1.24706328E+00 | −1.24142004E+02 | 2.16406901E+01 | 1.01418548E+03 |
| A18= | −4.68718863E−01 | 8.69224688E+01 | −8.82685724E+00 | −7.93367008E+02 |
| A20= | 1.28127386E−01 | −3.84648209E+01 | 1.50921696E+00 | 2.59718920E+02 |
| A22= | −2.47201569E−02 | 9.75169548E+00 | | |
| A24= | 3.18603087E−03 | −1.07773032E+00 | | |
| A26= | −2.45882110E−04 | | | |
| A28= | 8.58535028E−06 | | | |

| Surface # | 6 | 7 | 10 | 11 |
|---|---|---|---|---|
| K= | 2.74657000E−01 | −7.01310000E+00 | 0.00000000E+00 | 3.74115000E+00 |
| A4= | 2.59865075E−02 | 1.58260792E−01 | 3.44658771E−02 | −2.77688848E−01 |
| A6= | 7.43428568E−01 | −2.33508319E−01 | 2.18459293E−01 | −2.29608026E−01 |
| A8= | −8.00927502E+00 | 4.59070694E+00 | −2.39242767E−01 | 1.92578862E+00 |
| A10= | 5.55414084E+01 | −4.93546170E+01 | −5.28633235E+01 | −9.58778278E+00 |
| A12= | −2.38643095E+02 | 3.45865404E+02 | 7.07179454E+02 | 2.58464471E+01 |
| A14= | 6.25675743E+02 | −1.50370426E+03 | −4.39613946E+03 | −3.75355772E+01 |
| A16 | −1.00784807E+03 | 3.81446412E+03 | 1.46556894E+04 | 6.99977024E+00 |
| A18= | 9.22820748E+02 | −5.04620361E+03 | −2.53284998E+04 | 5.52919153E+01 |
| A20= | −3.65765245E+02 | 2.63864472E+03 | 1.78180938E+04 | −5.26626812E+01 |
| A22= | | | | |
| A24= | | | | |
| A26= | | | | |
| A28= | | | | |

TABLE 4B-continued

| Aspheric Coefficient | | | | |
|---|---|---|---|---|
| Surface # | 12 | 13 | 14 | 15 |
| K= | 0.00000000E+00 | 3.17852000E+01 | −1.73928000E+00 | −1.01422000E+00 |
| A4= | −3.72007642E−01 | 1.14107840E+00 | 1.76337939E+00 | −8.21309659E−02 |
| A6= | −1.66711652E−01 | −8.03626619E+00 | −8.65507604E+00 | 3.51191033E−01 |
| A8= | −1.32815259E+01 | 2.81870587E+01 | 2.57374282E+01 | 3.04320701E−01 |
| A10= | 1.48043954E+02 | −6.26499966E+01 | −5.09858524E+01 | −4.17574244E+00 |
| A12= | −7.85927570E+02 | 9.16162273E+01 | 6.94619644E+01 | 1.14906448E+01 |
| A14= | 2.45975641E+03 | −8.51328084E+01 | −6.52293054E+01 | −1.69261550E+01 |
| A16= | −4.75723883E+03 | 4.44793174E+01 | 4.14829167E+01 | 1.51789155E+01 |
| A18= | 5.56146691E+03 | −7.45982532E+00 | −1.70983106E+01 | −8.47584656E+00 |
| A20= | −3.58906399E+03 | −3.57102938E+00 | 4.16088855E+00 | 2.85712638E+00 |
| A22= | 9.80279072E+02 | 1.42494499E+00 | −4.78263809E−01 | −5.21911595E−01 |
| A24 | | | 9.65543833E−03 | 3.55593913E−02 |
| A26= | | | | 1.10806989E−03 |
| A28= | | | | |

| Surface # | 17 | 18 |
|---|---|---|
| K= | −9.95073000E−01 | −1.00000000E+00 |
| A4= | −8.28726597E−01 | −9.05171096E−01 |
| A6= | 1.04314001E+00 | 1.10183449E+00 |
| A8= | −1.48288311E+00 | −1.30524479E+00 |
| A10= | 1.61231180E+00 | 1.26378276E+00 |
| A12= | −1.17253690E+00 | −9.29532783E−01 |
| A14= | 5.51039732E−01 | 5.07833693E−01 |
| A16= | −1.61709440E−01 | −2.04699627E−01 |
| A18= | 2.67814797E−02 | 6.04075245E−02 |
| A20= | −1.45658679E−03 | −1.28445959E−02 |
| A22= | −2.70782706E−04 | 1.90973477E−03 |
| A24= | 5.16011008E−05 | −1.87920263E−04 |
| A26= | −2.65856073E−06 | 1.09720263E−05 |
| A28= | | −2.87293498E−07 |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 4A and TABLE 4B and satisfy the conditions stated in TABLE 4C below.

TABLE 4C

| f [mm] | 1.71 | f/f345 | 0.99 |
|---|---|---|---|
| Fno | 1.97 | f/f5 | 0.08 |
| HFOV [deg.] | 62.4 | f/f567 | 0.42 |
| (CT1 + T12)/f | 0.38 | f/f67 | 0.34 |
| (N2 + N3)/2 | 1.792 | f/f7 | −0.10 |
| (R12 + R13)/(R12 − R13) | 0.25 | f/R1 | −1.42 |
| (R13 − R14)/(R13 + R14) | 0.12 | f/R12 | −1.23 |
| (R5 + R6)/(R5 − R6) | −3.87 | f/R13 | 2.03 |
| (T45 + T56 + T67)ΣAT | 0.40 | Max(AT)/ΣAT | 0.30 |
| f/f1 | −0.55 | N2 | 1.946 |
| f/f12 | −0.77 | R1/R2 | 0.26 |
| f/f1234 | 0.53 | SL/TL | 0.69 |
| f/f2 | −0.12 | TD/TL | 0.75 |

5th Embodiment

Figure 5A:
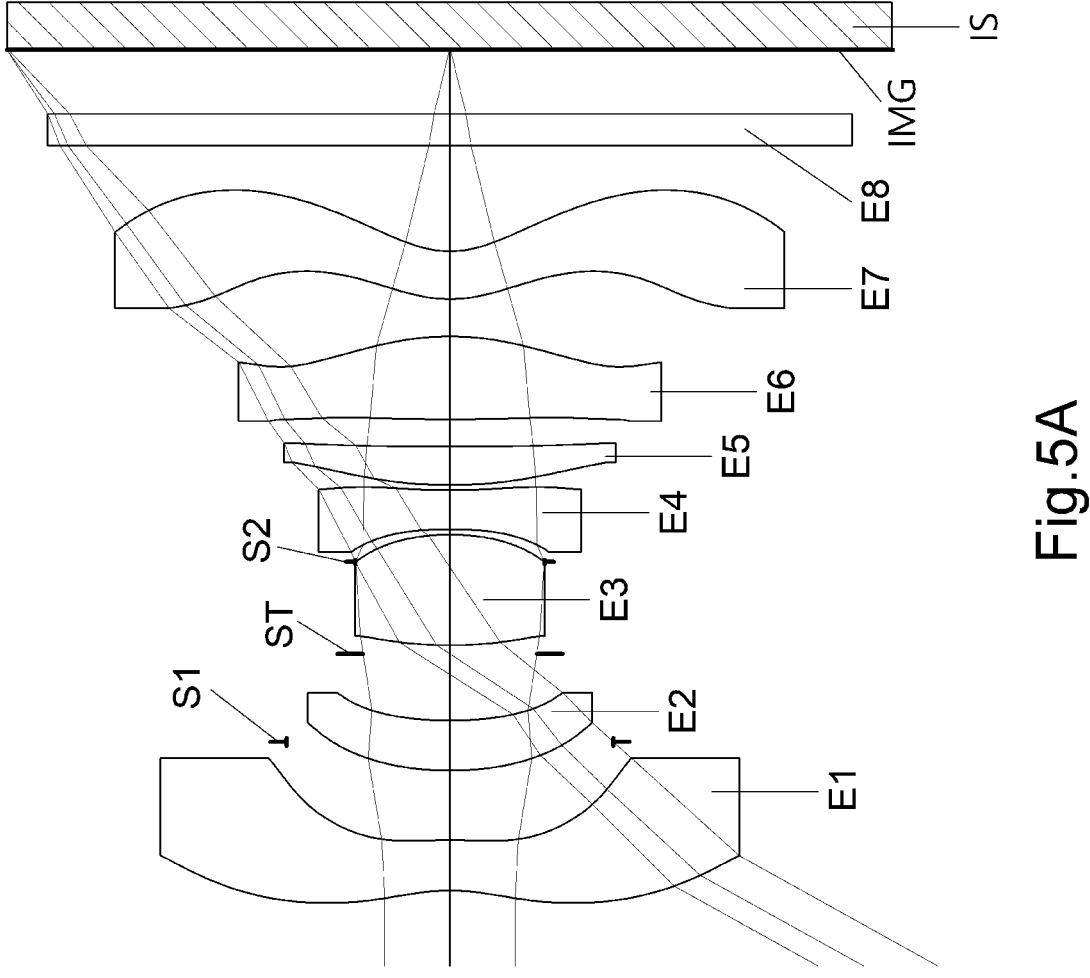
FIG. 5A is a schematic view of an imaging apparatus according to the 5th embodiment of the present disclosure.
Figure 5B:
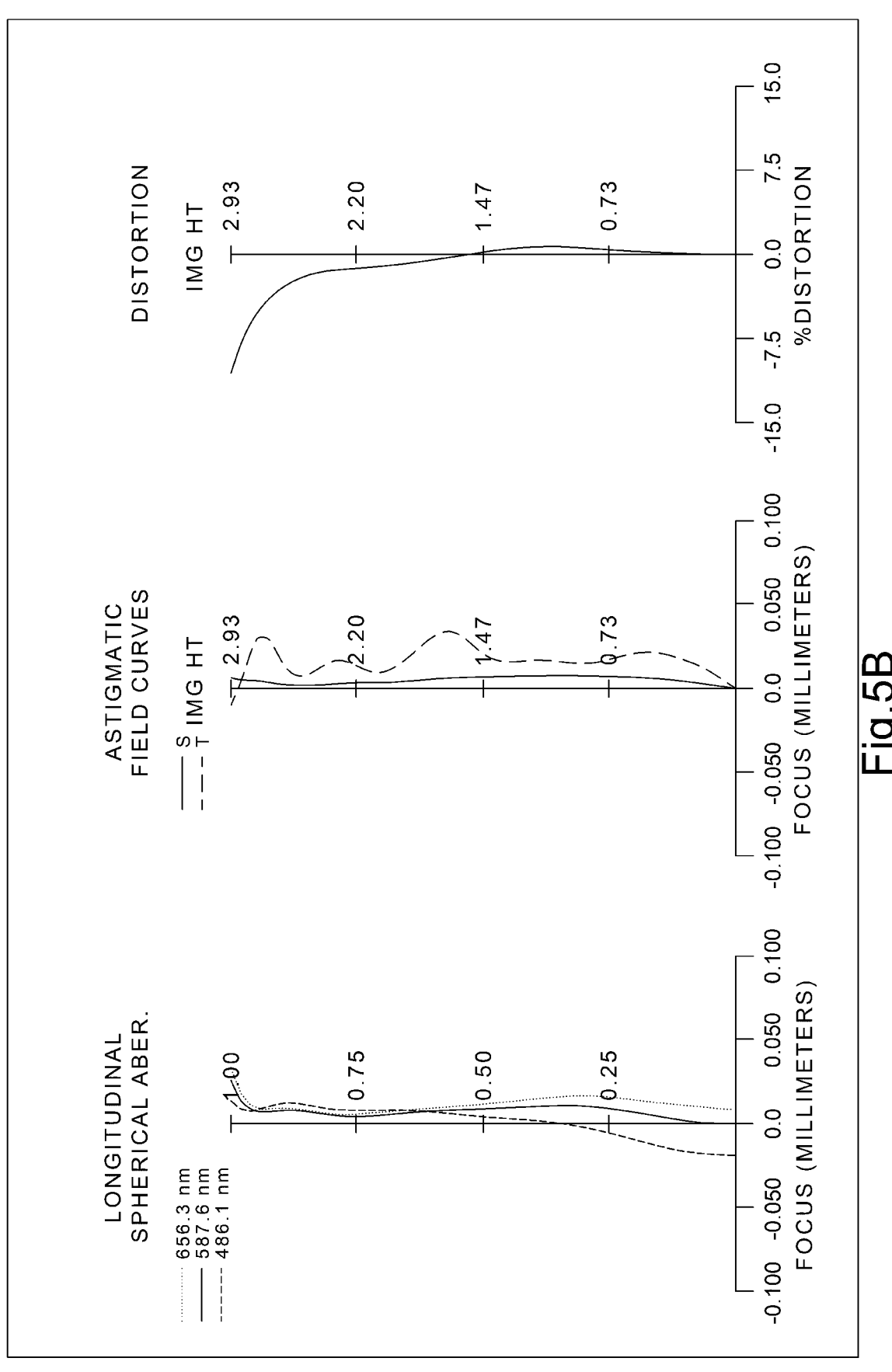
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an imaging optical lens assembly 5 of the present disclosure and an image sensor IS. The imaging optical lens assembly 5 includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has positive refractive power and is made of glass material. The second lens element E2 has an object-side surface being convex in a paraxial region thereof and having one inflection point on the object-side surface, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof and having one inflection point on the object-side surface, and an image-side surface being convex in a paraxial region thereof. Both the object-side surface and the image-side surface are aspheric.

The fourth lens element E4 has negative refractive power and is made of plastic material. The fourth lens element E4 has an object-side surface being concave in a paraxial region thereof, and an image-side surface being concave in a paraxial region thereof and having two inflection points and one critical point on the image-side surface. Both the object-side surface and the image-side surface are aspheric.

The fifth lens element E5 has positive refractive power and is made of plastic material. The fifth lens element E5 has an object-side surface being convex in a paraxial region thereof and having one inflection point on the object-side surface, and an image-side surface being concave in a paraxial region thereof and having three inflection points and one critical point on the image-side surface. Both the object-side surface and the image-side surface are aspheric.

The sixth lens element E6 has positive refractive power and is made of plastic material. The sixth lens element E6 has an object-side surface being convex in a paraxial region thereof and having three inflection points and one critical point on the object-side surface, and an image-side surface being convex in a paraxial region thereof and having two inflection points and one critical point on the image-side surface. Both the object-side surface and the image-side surface are aspheric.

The seventh lens element E7 has negative refractive power and is made of plastic material. The seventh lens element E7 has an object-side surface being convex in a paraxial region thereof and having two inflection points and one critical point on the object-side surface, and an image-side surface being concave in a paraxial region thereof and having one inflection point and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 5. The image sensor IS is disposed on or near the image surface IMG.

The detailed optical data of the 5th embodiment are shown in TABLE 5A, and the aspheric surface data are shown in TABLE 5B.

TABLE 5A (5th Embodiment)
f = 1.82 mm, Fno = 2.11, HFOV = 60.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.1955 | (ASP) | 0.332 | Plastic | 1.545 | 56.1 | −3.24 |
| 2 | | −4.0736 | (ASP) | 0.652 | | | | |
| 3 | Stop | Plano | | −0.190 | | | | |
| 4 | Lens 2 | 2.0985 | (ASP) | 0.332 | Glass | 1.922 | 18.9 | 10.30 |
| 5 | | 2.4891 | (ASP) | 0.442 | | | | |
| 6 | Ape. Stop | Plano | | 0.056 | | | | |
| 7 | Lens 3 | 2.7383 | (ASP) | 0.733 | Plastic | 1.544 | 56.0 | 1.97 |
| 8 | | −1.6009 | (ASP) | −0.180 | | | | |
| 9 | Stop | Plano | | 0.215 | | | | |
| 10 | Lens 4 | −3.1772 | (ASP) | 0.261 | Plastic | 1.639 | 23.5 | −4.00 |
| 11 | | 13.4228 | (ASP) | 0.035 | | | | |
| 12 | Lens 5 | 9.4844 | (ASP) | 0.251 | Plastic | 1.534 | 56.0 | 29.43 |
| 13 | | 23.6847 | (ASP) | 0.183 | | | | |
| 14 | Lens 6 | 19.6791 | (ASP) | 0.549 | Plastic | 1.534 | 56.0 | 3.33 |
| 15 | | −1.9382 | (ASP) | 0.247 | | | | |
| 16 | Lens 7 | 0.8466 | (ASP) | 0.318 | Plastic | 1.544 | 56.0 | −11.44 |
| 17 | | 0.6466 | (ASP) | 0.700 | | | | |
| 18 | Filter | Plano | | 0.210 | Glass | 1.517 | 64.2 | — |
| 19 | | Plano | | 0.425 | | | | |
| 20 | Image Surface | Plano | | — | | | | |

Remark: Reference wavelength is d-line 587.6 nm.
* The effective radius of the stop on Surface 3 is 1.082 mm.
* The effective radius of the stop on Surface 9 is 0.626 mm.

TABLE 5B

Aspheric Coefficient

| Surface # | 1 | 2 | 4 | 5 |
|---|---|---|---|---|
| K= | −1.00000000E+00 | 5.08699000E+00 | 6.03070000E−02 | −4.67551000E+00 |
| A4= | 1.02232241E+00 | 1.03495236E+00 | 2.06189274E−01 | 2.64720548E−01 |
| A6= | −1.92269304E+00 | −9.92554273E−01 | −7.32739827E−01 | −8.72811739E−01 |
| A8= | 3.04009413E+00 | −2.65492212E+00 | 2.77802708E+00 | 6.25077361E+00 |
| A10= | −3.74575596E+00 | 1.70288930E+01 | −7.89023735E+00 | −2.86559509E+01 |
| A12= | 3.49918208E+00 | −4.60847843E+01 | 1.70310362E+01 | 9.33324785E+01 |
| A14= | −2.45195523E+00 | 7.72150573E+01 | −2.50698502E+01 | −1.98480331E+02 |

TABLE 5B-continued

| | | Aspheric Coefficient | | |
|---|---|---|---|---|
| A16= | 1.28107475E+00 | −8.51194695E+01 | 2.34437329E+01 | 2.61257109E+02 |
| A18= | −4.94756458E−01 | 6.17620656E+01 | −1.25240962E+01 | −1.93141481E+02 |
| A20= | 1.38944458E−01 | −2.83430283E+01 | 2.86740579E+00 | 6.05960431E+01 |
| A22= | −2.75350066E−02 | 7.43071010E+00 | | |
| A24= | 3.64491681E−03 | −8.44555143E−01 | | |
| A26= | −2.88944070E−04 | | | |
| A28= | 1.03662055E−05 | | | |

| Surface # | 7 | 8 | 10 | 11 |
|---|---|---|---|---|
| K= | 0.00000000E+00 | 2.65447000E+00 | 0.00000000E+00 | −9.90000000E+01 |
| A4= | 7.18559881E−02 | 7.47457891E−02 | −2.71786043E−02 | 1.39308653E+00 |
| A6= | −1.22849353E+00 | −7.85783723E+00 | −8.65460919E+00 | −1.31484368E+01 |
| A8= | 1.97904453E+01 | 7.24832152E+01 | 6.21377820E+01 | 6.29374244E+01 |
| A10= | −2.00830536E+02 | −3.59391857E+02 | −1.99783702E+02 | −1.90707559E+02 |
| A12= | 1.23447710E+03 | 1.09791936E+03 | 1.49578906E+02 | 3.80115263E+02 |
| A14= | −4.67096085E+03 | −2.13626613E+03 | 1.01598000E+03 | −4.97231214E+02 |
| A16= | 1.04763597E+04 | 2.57493074E+03 | −3.57517211E+03 | 4.11104184E+02 |
| A18= | −1.26345155E+04 | −1.74868230E+03 | 4.84579698E+03 | −1.94657163E+02 |
| A20= | 6.14935060E+03 | 5.11022251E+02 | −2.49338040E+03 | 4.01684609E+01 |
| A22= | | | | |
| A24= | | | | |
| A26= | | | | |
| A28= | | | | |

| Surface # | 12 | 13 | 14 | 15 |
|---|---|---|---|---|
| K= | 0.00000000E+00 | 3.07666000E+01 | −9.83172000E+01 | −1.76903000E+00 |
| A4= | 1.65786272E+00 | 1.42054039E−02 | 7.68517857E−02 | −1.71096517E−01 |
| A6= | −1.14411308E+01 | 3.98541401E−01 | −5.39420835E−02 | 9.47001986E−01 |
| A8= | 4.79344707E+01 | −4.11804105E+00 | −1.15575578E+00 | −1.75804848E+00 |
| A10= | −1.34478754E+02 | 1.60080839E+01 | 4.19986722E+00 | 7.32135132E−01 |
| A12= | 2.63329881E+02 | −3.38889075E+01 | −7.81218399E+00 | 4.10301373E+00 |
| A14= | −3.65725457E+02 | 4.39883782E+01 | 9.01692900E+00 | −1.06112088E+01 |
| A16= | 3.58507461E+02 | −3.63186202E+01 | −6.54400319E+00 | 1.32391632E+01 |
| A18= | −2.41949911E+02 | 1.87118334E+01 | 2.87402290E+00 | −1.00202092E+01 |
| A20= | 1.06627144E+02 | −5.49575509E+00 | −6.94039308E−01 | 4.79334565E+00 |
| A22= | −2.75011909E+01 | 7.01432310E−01 | 7.03913494E−02 | −1.41876471E+00 |
| A24= | 3.12764752E+00 | | | 2.37683084E−01 |
| A26= | | | | −1.72643827E−02 |
| A28= | | | | |

| Surface # | 16 | 17 |
|---|---|---|
| K= | −9.77769000E−01 | −1.00000000E+00 |
| A4= | −8.75573337E−01 | −9.61184067E−01 |
| A6= | 1.13190390E+00 | 1.20850810E+00 |
| A8= | −1.53274324E+00 | −1.41225099E+00 |
| A10= | 1.65397097E+00 | 1.33677455E+00 |
| A12= | −1.26066399E+00 | −9.65491207E−01 |
| A14= | 6.55497084E−01 | 5.20891093E−01 |
| A16= | −2.30662448E−01 | −2.08297636E−01 |
| A18= | 5.45480425E−02 | 6.12233421E−02 |
| A20= | −8.49414039E−03 | −1.30135711E−02 |
| A22= | 8.30066296E−04 | 1.94074632E−03 |
| A24= | −4.57590642E−05 | −1.92118400E−04 |
| A26= | 1.07207124E−06 | 1.13111727E−05 |
| A28= | | −2.99167564E−07 |

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 5A and TABLE 5B and satisfy the conditions stated in TABLE 5C below.

TABLE 5C

| f[mm] | 1.82 | f/f345 | 0.58 |
|---|---|---|---|
| Fno | 2.11 | f/f5 | 0.06 |
| HFOV [deg.] | 60.9 | f/f567 | 0.56 |
| (CT1 + T12)/f | 0.44 | f/f67 | 0.50 |
| (N2 + N3)/2 | 1.733 | f/f7 | −0.16 |
| (R12 + R13)/(R12 − R13) | 0.39 | f/R1 | −1.52 |
| (R13 − R14)/(R13 + R14) | 0.13 | f/R12 | −0.94 |
| (R5 + R6)/(R5 − R6) | 0.26 | f/R13 | 2.15 |

TABLE 5C-continued

| (T45 + T56 + T67)ΣAT | 0.32 | Max(AT)/ΣAT | 0.34 |
|---|---|---|---|
| f/f1 | −0.56 | N2 | 1.922 |
| f/f12 | −0.38 | R1/R2 | 0.29 |
| f/f1234 | 0.32 | SL/TL | 0.72 |
| f/f2 | 0.18 | TD/TL | 0.76 |

6th Embodiment

Figure 6A:
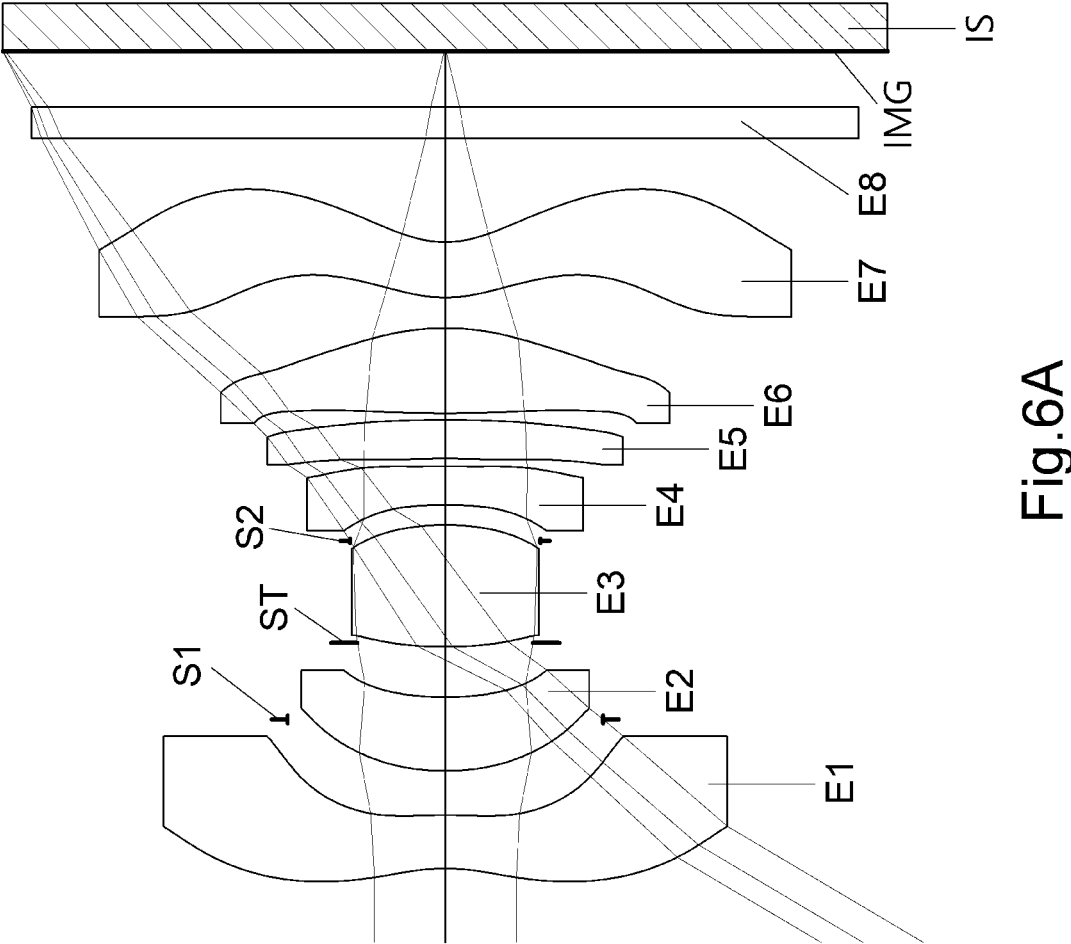
FIG. 6A is a schematic view of an imaging apparatus according to the 6th embodiment of the present disclosure.
Figure 6B:
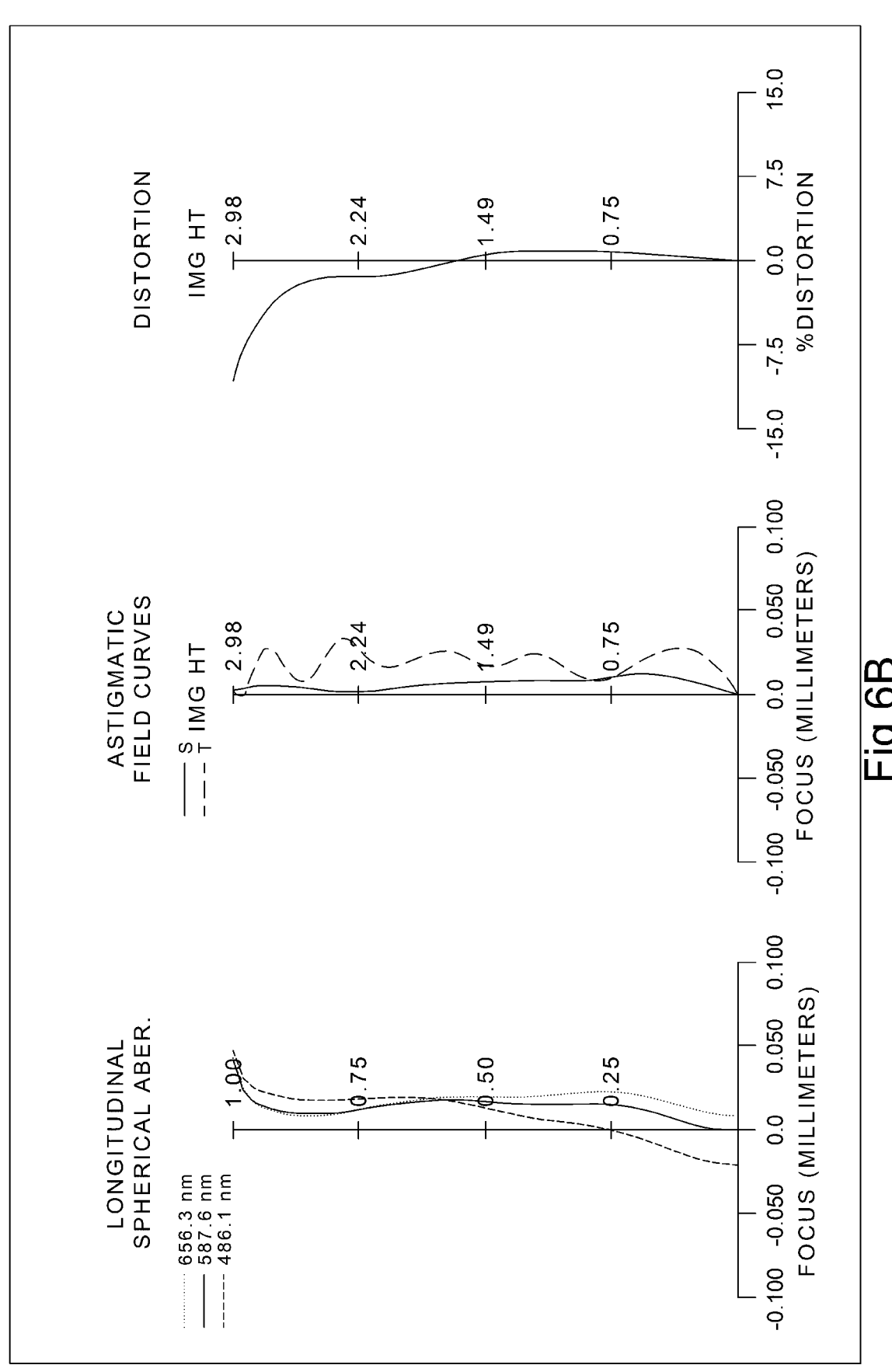
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an imaging optical lens assembly 6 of the present disclosure and an image sensor IS. The imaging optical lens assembly 6 includes, in order from an object side to an image side along an optical path, a first lens element E1, a stop S1, a second lens element E2, an aperture stop ST, a third lens element E3, a stop S2, a fourth lens element E4, a fifth lens element E5, a sixth lens element E6, a seventh lens element E7, a filter E8, and an image surface IMG.

The first lens element E1 has negative refractive power and is made of plastic material. The first lens element E1 has an object-side surface being concave in a paraxial region thereof and having two inflection points and one critical point on the object-side surface, and an image-side surface being convex in a paraxial region thereof and having two inflection points and one critical point on the image-side surface. Both the object-side surface and the image-side surface are aspheric.

The second lens element E2 has positive refractive power and is made of plastic material. The second lens element E2 has an object-side surface being convex in a paraxial region thereof and having one inflection point on the object-side surface, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof and having one inflection point on the object-side surface, and an image-side surface being convex in a paraxial region thereof. Both the object-side surface and the image-side surface are aspheric.

The fourth lens element E4 has negative refractive power and is made of plastic material. The fourth lens element E4 has an object-side surface being concave in a paraxial region thereof, and an image-side surface being convex in a paraxial region thereof and having three inflection points and two critical points on the image-side surface. Both the object-side surface and the image-side surface are aspheric.

The fifth lens element E5 has negative refractive power and is made of plastic material. The fifth lens element E5 has an object-side surface being concave in a paraxial region thereof and having two inflection points and two critical points on the object-side surface, and an image-side surface being convex in a paraxial region thereof. Both the object-side surface and the image-side surface are aspheric.

The sixth lens element E6 has positive refractive power and is made of plastic material. The sixth lens element E6 has an object-side surface being convex in a paraxial region thereof and having one inflection point and one critical point on the object-side surface, and an image-side surface being convex in a paraxial region thereof and having two inflection points on the image-side surface. Both the object-side surface and the image-side surface are aspheric.

The seventh lens element E7 has negative refractive power and is made of plastic material. The seventh lens element E7 has an object-side surface being convex in a paraxial region thereof and having three inflection points and one critical point on the object-side surface, and an image-side surface being concave in a paraxial region thereof and having three inflection points and one critical point on the image-side surface. Both the object-side surface and the image-side surface are aspheric.

The filter E8 is disposed between the seventh lens element E7 and the image surface IMG. The filter E8 is made of glass material and does not affect the focal length of the imaging optical lens assembly 7. The image sensor IS is disposed on or near the image surface IMG.

The detailed optical data of the 6th embodiment are shown in TABLE 6A, and the aspheric surface data are shown in TABLE 6B.

TABLE 6A

| | | | | (6th Embodiment) f = 1.97 mm, Fno = 2.06, HFOV = 59.4 deg. | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −1.1740 | (ASP) | 0.358 | Plastic | 1.562 | 44.6 | −3.42 |
| 2 | | −3.3527 | (ASP) | 0.645 | | | | |
| 3 | Stop | Plano | | −0.347 | | | | |
| 4 | Lens 2 | 1.5942 | (ASP) | 0.497 | Plastic | 1.660 | 20.4 | 8.06 |
| 5 | | 1.9940 | (ASP) | 0.367 | | | | |
| 6 | Ape. Stop | Plano | | −0.028 | | | | |
| 7 | Lens 3 | 2.4669 | (ASP) | 0.822 | Plastic | 1.544 | 56.0 | 2.07 |
| 8 | | −1.8222 | (ASP) | −0.107 | | | | |
| 9 | Stop | Plano | | 0.242 | | | | |
| 10 | Lens 4 | −3.0231 | (ASP) | 0.260 | Plastic | 1.686 | 18.4 | −7.93 |
| 11 | | −7.0443 | (ASP) | 0.053 | | | | |

TABLE 6A-continued (6th Embodiment)
f = 1.97 mm, Fno = 2.06, HFOV = 59.4 deg.

| | Surface # | Curvature Radius | | Thickness | Material | Index | Abbe # | Focal Length |
|---|---|---|---|---|---|---|---|---|
| 12 | Lens 5 | −2.9057 | (ASP) | 0.260 | Glass | 1.613 | 37.0 | −7.56 |
| 13 | | −8.0626 | (ASP) | 0.045 | | | | |
| 14 | Lens 6 | 10.3983 | (ASP) | 0.575 | Plastic | 1.544 | 56.0 | 2.80 |
| 15 | | −1.7515 | (ASP) | 0.206 | | | | |
| 16 | Lens 7 | 0.9101 | (ASP) | 0.373 | Plastic | 1.544 | 56.0 | −9.77 |
| 17 | | 0.6648 | (ASP) | 0.700 | | | | |
| 18 | Filter | Plano | | 0.210 | Glass | 1.517 | 64.2 | — |
| 19 | | Plano | | 0.377 | | | | |
| 20 | Image Surface | Plano | | — | | | | |

Remark: Reference wavelength is d-line 587.6 nm.
* The effective radius of the stop on Surface 3 is 1.063 mm.
* The effective radius of the stop on Surface 9 is 0.641 mm.

TABLE 6B

Aspheric Coefficient

| Surface # | 1 | 2 | 4 | 5 |
|---|---|---|---|---|
| K= | −1.00000000E+00 | 2.59963000E+00 | −5.80554000E−02 | −3.61767000E−01 |
| A4= | 1.00824123E+00 | 1.09510721E+00 | 2.82990631E−01 | 2.12586334E−01 |
| A6= | −1.90549749E+00 | −1.31422015E+00 | −1.08386201E+00 | −4.70891687E−01 |
| A8= | 3.07017366E+00 | −1.70021661E+00 | 3.79873852E+00 | 5.66856910E+00 |
| A10= | −3.84811912E+00 | 1.54055493E+01 | −1.02661606E+01 | −3.40776683E+01 |
| A12= | 3.64766299E+00 | −4.47574993E+01 | 2.07878957E+01 | 1.38896701E+02 |
| A14= | −2.58767244E+00 | 7.78513890E+01 | −2.86973651E+01 | −3.51808272E+02 |
| A16= | 1.36608600E+00 | −8.80480174E+01 | 2.52814540E+01 | 5.33444087E+02 |
| A18= | −5.32243418E−01 | 6.51372639E+01 | −1.27557791E+01 | −4.39000422E+02 |
| A20= | 1.50603239E−01 | −3.03518478E+01 | 2.75275673E+00 | 1.47217454E+02 |
| A22= | −3.00436663E−02 | 8.05465159E+00 | | |
| A24= | 4.00088323E−03 | −9.24316809E−01 | | |
| A26= | −3.18944997E−04 | | | |
| A28= | 1.15046640E−05 | | | |

| Surface # | 7 | 8 | 10 | 11 |
|---|---|---|---|---|
| K= | 0.00000000E+00 | 2.66369000E+00 | 0.00000000E+00 | 8.46882000E+00 |
| A4= | 1.30490252E−02 | −1.08159660E−01 | −1.94331711E−01 | 1.46250941E+00 |
| A6= | 1.64063596E+00 | −3.24221952E+00 | −4.68936984E+00 | −1.24728343E+01 |
| A8= | −2.98326893E+01 | 3.64735258E+01 | 2.53238013E+01 | 5.59023778E+01 |
| A10= | 3.13602585E+02 | −2.41820699E+02 | −2.49679689E+01 | −1.66107398E+02 |
| A12= | −2.02281078E+03 | 1.04797678E+03 | −3.81091370E+02 | 3.44265536E+02 |
| A14= | 8.06576481E+03 | −2.97304538E+03 | 2.32997048E+03 | −5.05131185E+02 |
| A16= | −1.94262818E+04 | 5.29612622E+03 | −6.66011587E+03 | 5.19509255E+02 |
| A18= | 2.59073143E+04 | −5.36646630E+03 | 1.07147441E+04 | −3.57292429E+02 |
| A20= | −1.47181737E+04 | 2.35563591E+03 | −9.32652330E+03 | 1.47115350E+02 |
| A22= | | | 3.42034332E+03 | −2.72626795E+01 |
| A24= | | | | |
| A26= | | | | |
| A28= | | | | |

| Surface # | 12 | 13 | 14 | 15 |
|---|---|---|---|---|
| K= | 1.15062000E+00 | 3.04833000E+01 | −7.77244000E+01 | −7.34933000E−01 |
| A4= | 1.92029486E+00 | 2.79630613E−01 | 1.82724669E−01 | −1.53771985E−01 |
| A6= | −1.15027506E+01 | −2.25258410E+00 | −1.27056021E+00 | 8.22230185E−01 |
| A8= | 4.37020870E+01 | 7.80129688E+00 | 3.84088117E+00 | −1.01480733E+00 |
| A10= | −1.12633308E+02 | −1.57718240E+01 | −6.82421285E+00 | −7.46874097E−01 |
| A12= | 2.04456518E+02 | 2.11226598E+01 | 7.18249606E+00 | 4.75846128E+00 |
| A14= | −2.67490754E+02 | −1.97386539E+01 | −4.15312491E+00 | −8.49739232E+00 |
| A16= | 2.51900613E+02 | 1.28529191E+01 | 8.52342504E−01 | 8.76038045E+00 |
| A18= | −1.65678576E+02 | −5.53403928E+00 | 3.70939641E−01 | −5.73676140E+00 |
| A20= | 7.14669362E+01 | 1.39921542E+00 | −2.49118157E−01 | 2.41517786E+00 |
| A22= | −1.79620241E+01 | −1.55507106E−01 | 4.14472305E−02 | −6.33416922E−01 |
| A24= | 1.97312603E+00 | | | 9.42260060E−02 |
| A26= | | | | −6.07381442E−03 |
| A28= | | | | |

TABLE 6B-continued

| | Aspheric Coefficient | |
|---|---|---|
| Surface # | 16 | 17 |
| K= | −9.60204000E−01 | −1.00000000E+00 |
| A4= | −9.12108238E−01 | −1.00725186E+00 |
| A6= | 1.16807151E+00 | 1.30973415E+00 |
| A8= | −1.35493736E+00 | −1.47505430E+00 |
| A10= | 1.20884155E+00 | 1.29126214E+00 |
| A12= | −7.99077725E−01 | −8.56537304E−01 |
| A14= | 3.84176266E−01 | 4.26394531E−01 |
| A16= | −1.31529089E−01 | −1.58211658E−01 |
| A18= | 3.13584499E−02 | 4.33263055E−02 |
| A20= | −5.04900993E−03 | −8.60405975E−03 |
| A22= | 5.20348998E−04 | 1.20089198E−03 |
| A24= | −3.07987919E−05 | −1.11368408E−04 |
| A26= | 7.90228235E−07 | 6.14524512E−06 |
| A28= | | −1.52332769E−07 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 6A and TABLE 6B and satisfy the conditions stated in TABLE 6C below.

TABLE 6C

| f [mm] | 1.97 | f/f345 | 0.53 |
|---|---|---|---|
| Fno | 2.06 | f/f5 | −0.26 |
| HFOV [deg.] | 59.4 | f/f567 | 0.39 |
| (CT1 + T12)/f | 0.33 | f/f67 | 0.66 |
| (N2 + N3)/2 | 1.602 | f/f7 | −0.20 |
| (R12 + R13)/(R12 − R13) | 0.32 | f/R1 | −1.68 |
| (R13 − R14)/(R13 + R14) | 0.16 | f/R12 | −1.12 |
| (R5 + R6)/(R5 − R6) | 0.15 | f/R13 | 2.16 |
| (T45 + T56 + T67)ΣAT | 0.28 | Max(AT)/ΣAT | 0.32 |
| f/f1 | −0.58 | N2 | 1.660 |
| f/f12 | −0.34 | R1/R2 | 0.35 |
| f/f1234 | 0.57 | SL/TL | 0.72 |
| f/f2 | 0.24 | TD/TL | 0.77 |

7th Embodiment

Figure 8:
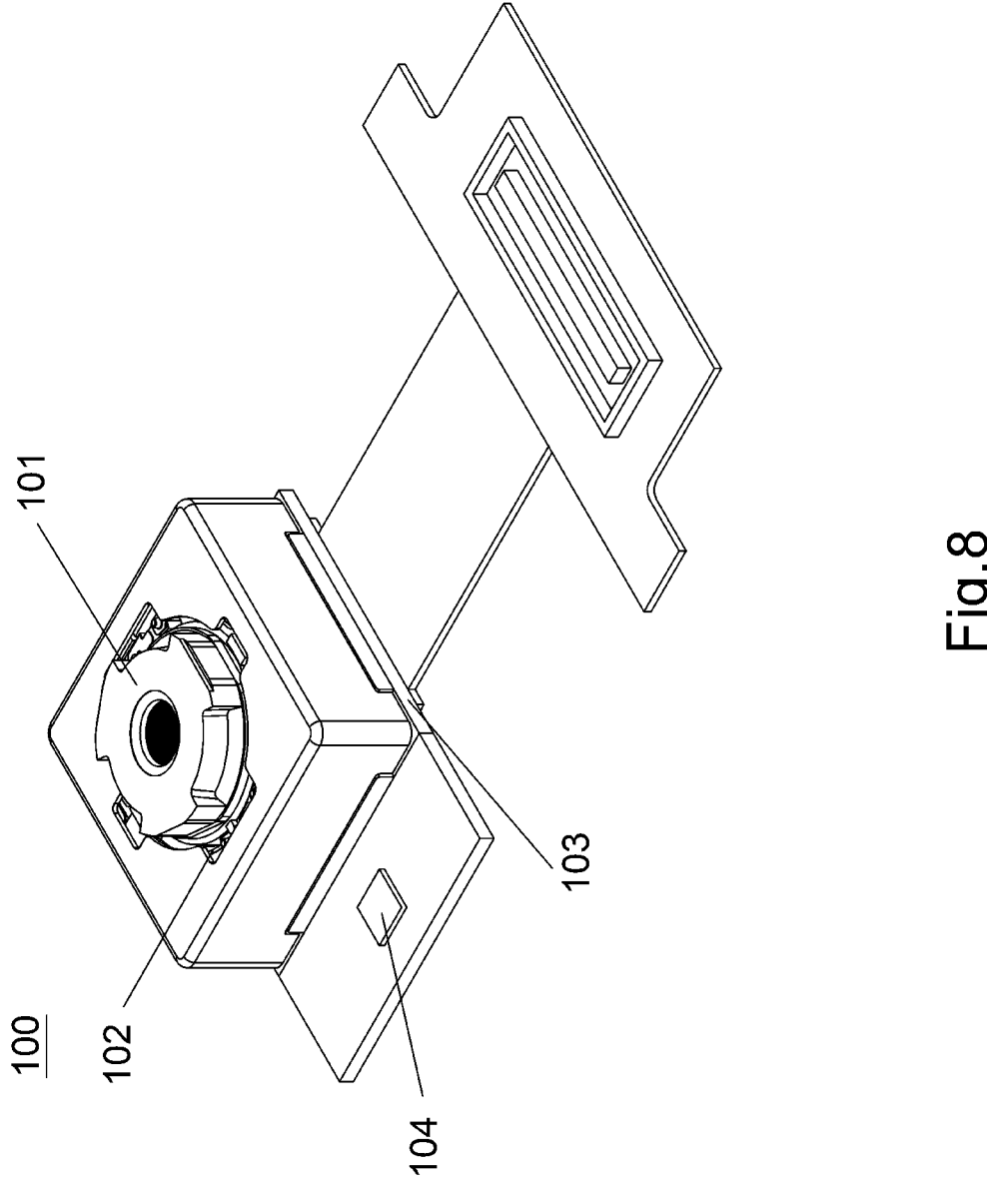
FIG. 8 is a 3-dimensional schematic view of an imaging apparatus according to the 7th embodiment of the present disclosure.

Please refer to FIG. 8. FIG. 8 is a 3-dimensional schematic view of an imaging apparatus 100 according to the 7th embodiment of the present disclosure. In the present embodiment, the imaging apparatus 100 is a camera module. The imaging apparatus 100 includes a photographing optical lens system 101, a driving device 102, and an image sensor 103. The photographing optical lens system 101 includes the imaging optical lens assembly 1 of the 1st embodiment described above and a lens barrel (not otherwise herein labeled) for carrying the imaging optical lens assembly 1. The imaging apparatus 100 obtains an image from light convergence in the photographing optical lens system 101, and focusing by the driving device 102 so as to form the image on the image sensor 103 (the image sensor IS in the 1st embodiment), and outputs the image data thereafter.

The driving device 102 may be an auto-focus module that can be driven by a voice coil motor (VCM), a micro electro-mechanical system (MEMS), a piezoelectric system, shape memory alloys or other driving systems. The driving device 102 allows the photographing optical lens system 101 to obtain a better imaging position so as to obtain a clear image at different object distances.

The imaging apparatus 100 may be equipped with an image sensor 103 (e.g., CMOS, CCD) with high sensitivity and low noise on the image surface to provide accurate and satisfactory image quality from the photographing optical lens system 101.

In addition, the imaging apparatus 100 may further include an image stabilizer 104, which may be a motion sensing element such as an accelerometer, a gyro sensor or a Hall Effect sensor. The image stabilizer 104 in the 7th embodiment is a gyro sensor but is not limited thereto. By adjusting the photographing optical lens system 101 in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

The imaging apparatus 100 of the present disclosure is not limited to being applied to smartphones. The imaging apparatus 100 may be used in focus adjusting systems depending on the needs, while it features excellent aberration correction and provides satisfactory image quality. For example, the imaging apparatus 100 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual reality, motion devices, home intelligent auxiliary systems and other electronic devices.

8th Embodiment

Figure 9A:
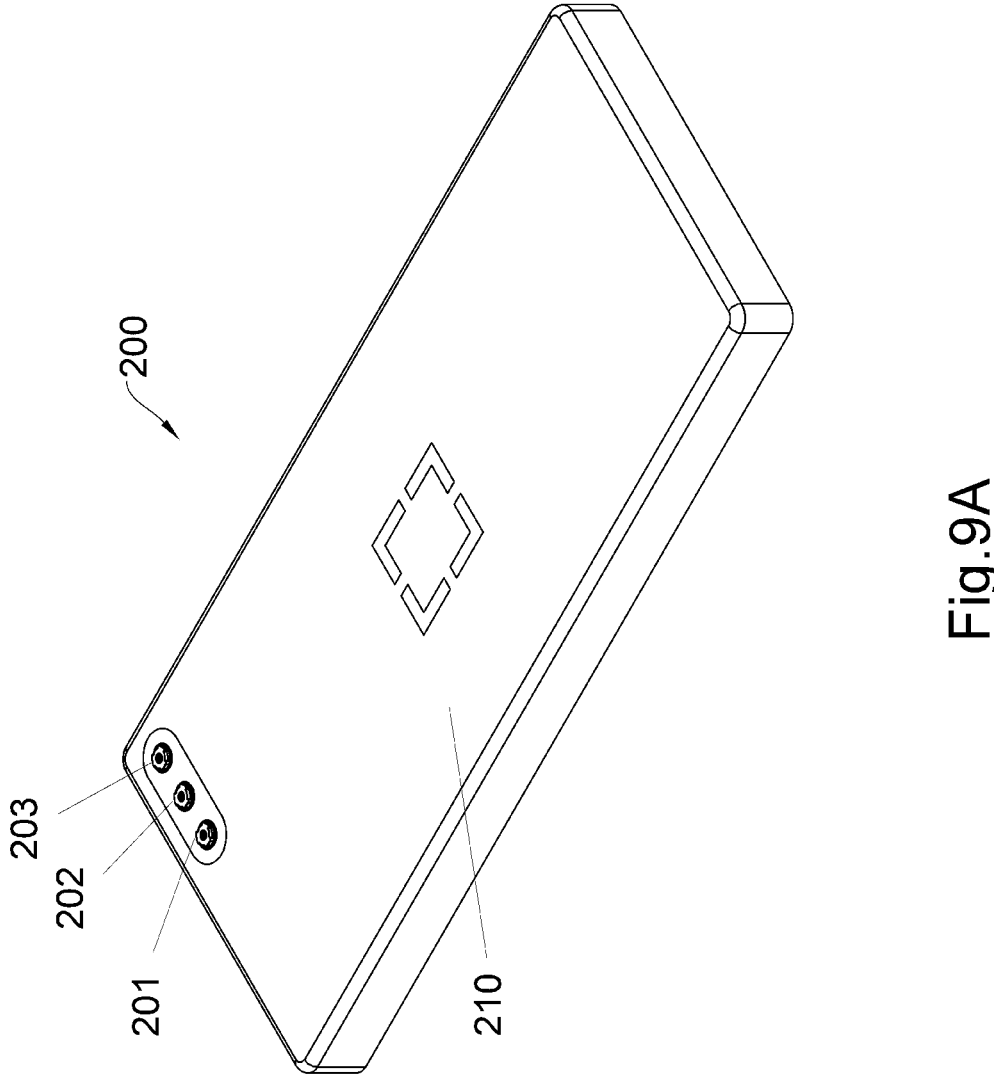
FIG. 9A is a front view of an electronic device according to the 8th embodiment of the present disclosure.
Figure 9B:
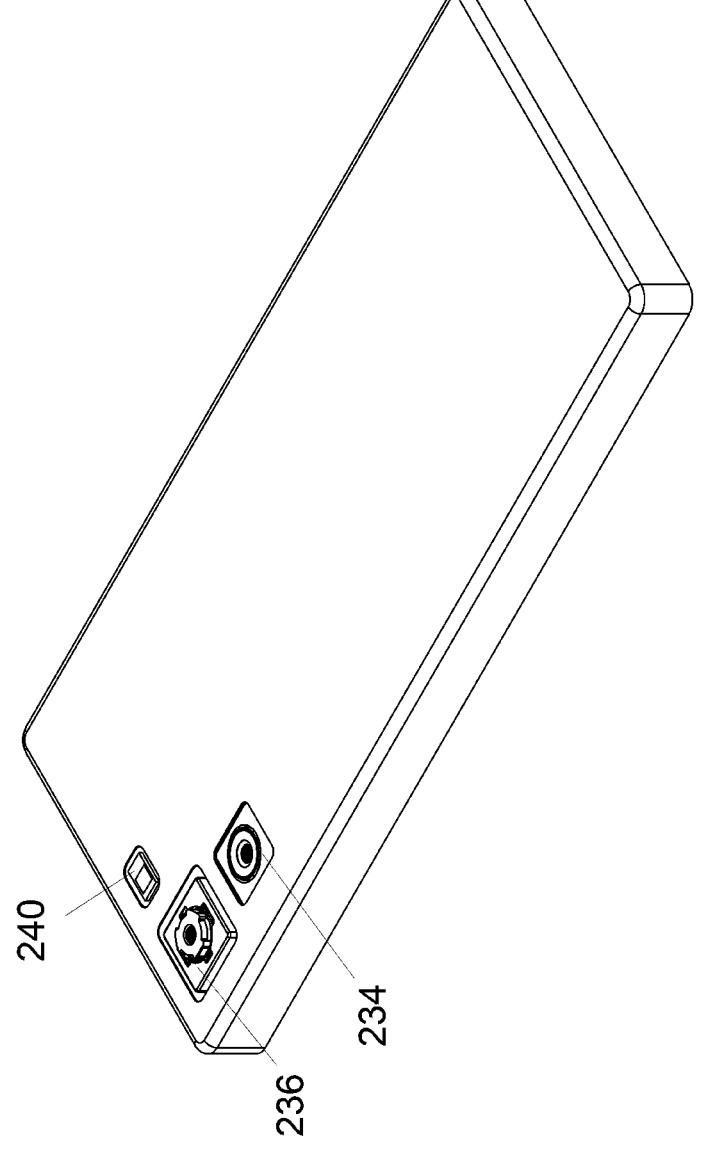
FIG. 9B is a rear view of the electronic device according to the 8th embodiment of the present disclosure.

Please refer to FIG. 9A and FIG. 9B. FIG. 9A is a front view of an electronic device 200 according to the 8th embodiment. FIG. 9B is a rear view of the electronic device 200 shown in FIG. 9A. In the present embodiment, the electronic device 200 is a smartphone. As shown in FIG. 9A, the electronic device 200 includes a display 210, a TOF (Time of Flight) module 201, an imaging apparatus 202, and an imaging apparatus 203 on the front side of the electronic device 200. The imaging apparatus 202 and the imaging apparatus 203 are located above the display 210, facing the same direction and arranged horizontally on the upper edge of electronic device 200. The imaging apparatus 202 is an ultra-wide angle configuration, and the imaging apparatus 203 is a wide-angle configuration. The field of view of the imaging apparatus 202 is larger than that of the imaging apparatus 203 by at least 30 degrees.

As shown in FIG. 9B, the electronic device 200 includes a flash module 240, an imaging apparatus 234 and an imaging apparatus 236 on the back side of the electronic device 200. The imaging apparatus 234 and the imaging apparatus 236 face the same direction, and are vertically arranged on the upper edge of the back side of the electronic device 200. The imaging apparatus 234 is an ultra-wide angle configuration, and the imaging apparatus 236 is a wide-angle configuration utilizing the imaging optical lens assembly of the present disclosure. The field of view of the imaging apparatus 234 is larger than that of the imaging apparatus 236 by at least 20 degrees.

9th Embodiment

Figure 10:
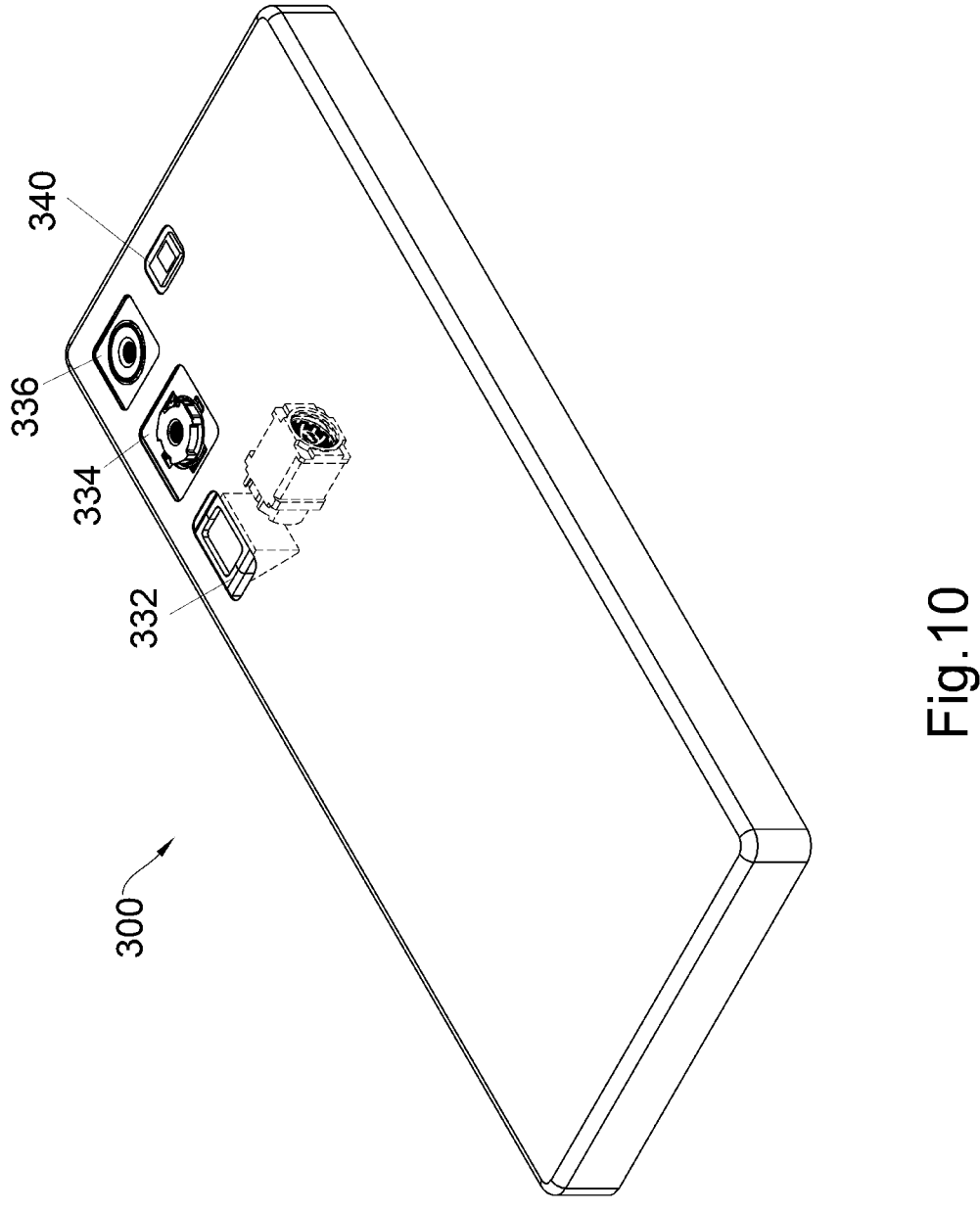
FIG. 10 is a rear view of the electronic device according to the 9th embodiment of the present disclosure.

Please refer to FIG. 10. FIG. 10 is a rear view of an electronic device 300 according to the 9th embodiment. As shown in FIG. 9, the electronic device 300 includes a flash module 340, an imaging apparatus 332, an imaging apparatus 334, and an imaging apparatus 336 on the back side of the electronic device 300. The imaging apparatus 332, the imaging apparatus 334, and the imaging apparatus 336 face the same direction, and are vertically arranged on the upper edge of the back side of the electronic device 300, at the proximity of the imaging apparatus 336. The imaging apparatus 336 is an ultra-wide angle configuration, and the imaging apparatus 334 is a wide-angle configuration utilizing the imaging optical lens assembly of the present disclosure, and the imaging apparatus 332 is a telephoto configuration. The field of view of the imaging apparatus 336 is larger than that of the imaging apparatus 334 by at least 20 degrees, and the field of view of the imaging apparatus 334 is larger than that of the imaging apparatus 332 by at least 20 degrees, so that for the imaging apparatuses disposed on the back side of the electronic device 300, the largest field of view with the imaging apparatus 336 is larger than the smallest field of view with the imaging apparatus 332 by at least 40 degrees.

10th Embodiment

Figure 11:
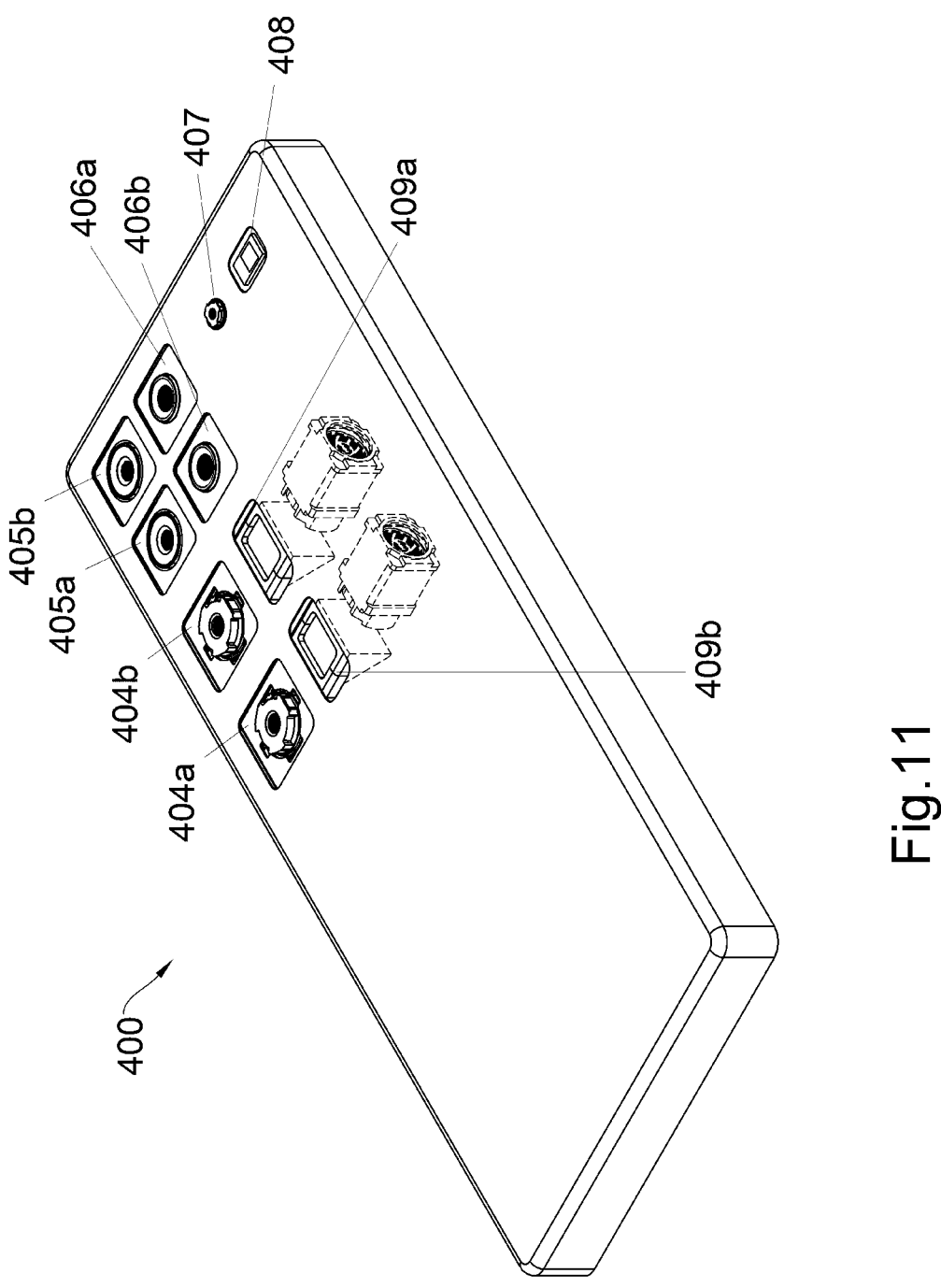
FIG. 11 is a rear view of the electronic device according to the 10th embodiment of the present disclosure.

Please refer to FIG. 11. FIG. 11 is a rear view of an electronic device 400 according to the 10th embodiment. As shown in FIG. 11, the electronic device 400 includes a TOF (Time of Flight) module 407, a flash module 408, an imaging apparatus 404a, an imaging apparatus 404b, an imaging apparatus 405a, an imaging apparatus 405b, an imaging apparatus 406a, an imaging apparatus 406b, an imaging apparatus 409a, and an imaging apparatus 409b on the back side of the electronic device 400. The imaging apparatus 404a, the imaging apparatus 404b, the imaging apparatus 405a, the imaging apparatus 405b, the imaging apparatus 406a, the imaging apparatus 406b, the imaging apparatus 409a, and the imaging apparatus 409b face the same direction, and are divided into two rows vertically arranged on the back side of the electronic device 400. The TOF (Time of Flight) module 407 and the flash module 408 are disposed on the upper edge of the back side of the electronic device 400, at the proximity of the imaging apparatus 406a. The imaging apparatuses 405a and 405b are ultra-wide angle configurations. The imaging apparatuses 404a and 404b are wide-angle configurations utilizing the imaging optical lens assembly of the present disclosure. The imaging apparatuses 406a and 406b are telephoto configurations. The imaging apparatuses 409a and 409b are tele-photo configurations with non-circular openings and containing an optical element which allows directional changes of the optical path. The fields of view of the imaging apparatuses 405a, 405b are larger than those of the imaging apparatuses 404a, 404b by at least 30 degrees. The fields of view of the imaging apparatuses 404a, 404b are larger than those of the imaging apparatuses 406a, 406b, 409a, and 409b by at least 30 degrees.

11th Embodiment

Figure 12A:
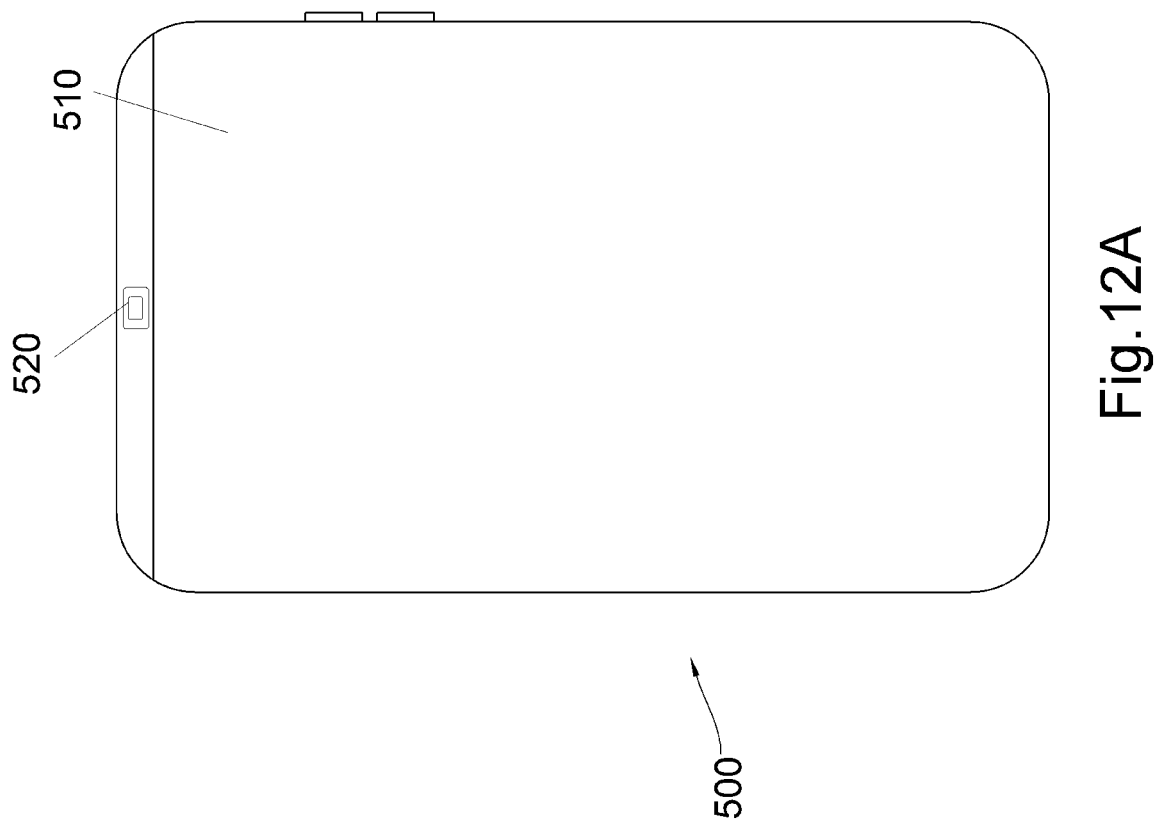
FIG. 12A is a front view of an electronic device according to the 11th embodiment of the present disclosure.
Figure 12B:
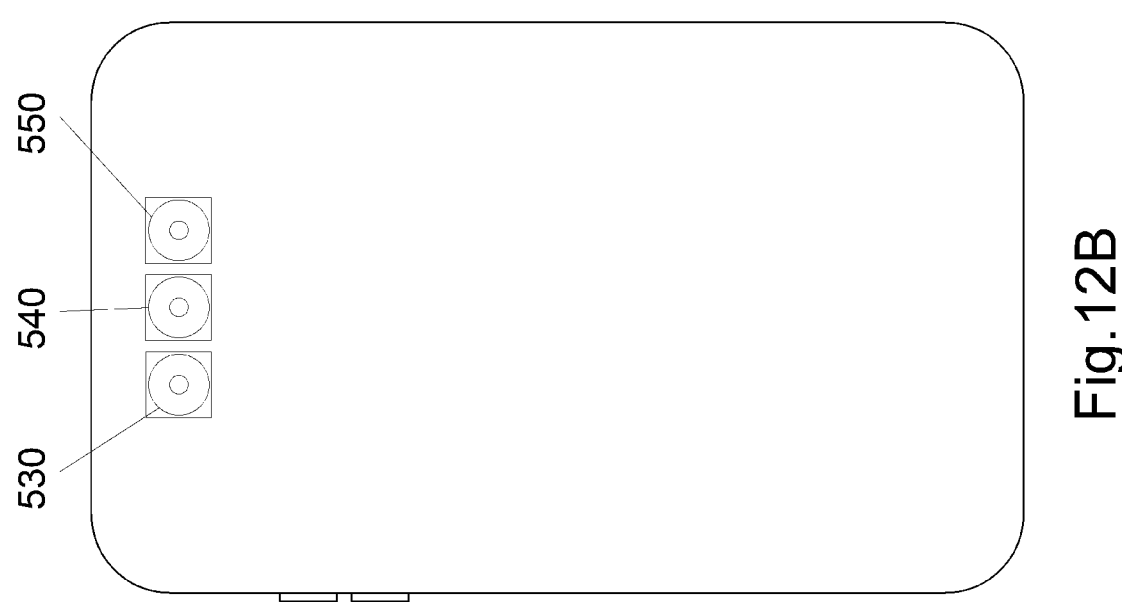
FIG. 12B is a rear view of the electronic device according to the 11th embodiment of the present disclosure.

Please refer to FIG. 12A and FIG. 12B. FIG. 12A is a front view of an electronic device 500 according to the 11th embodiment. FIG. 12B is a rear view of the electronic device 500 shown in FIG. 12A. In the present embodiment, the electronic device 500 is a smartphone.

As shown in FIG. 12A, the front of the electronic device 500 includes a display 510 and an imaging apparatus 520, wherein the imaging apparatus 520 utilizing the imaging optical lens assembly of the present disclosure. As shown in FIG. 12B, the back of the electronic device 500 includes a telephoto configuration 530, a wide-angle configuration 540, and an ultra-wide configuration 550.

The aforementioned electronic apparatus is merely exemplary of practical use of the present disclosure and does not limit the scope of application of the imaging apparatus of the present disclosure. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1A-6C show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising seven lens elements, the seven lens elements being, in order from an object side to an image side along an optical path: a first lens element, a second lens element, a third lens element, a fourth lens element, a fifth lens element, a sixth lens element and a seventh lens element, each of the first through seventh lens elements having an object-side surface facing the object side and an image-side surface facing the image side:

wherein the first lens element has negative refractive power, the object-side surface of the first lens element is concave in a paraxial region thereof and the image-side surface of the first lens element is convex in a paraxial region thereof, the image-side surface of the seventh lens element has at least one inflection point; wherein a total number of lens elements with refractive power of the imaging optical lens assembly is seven, the seven lens elements with refractive power being the first lens element, the second lens element, the third lens element, the fourth lens element, the fifth lens element, the sixth lens element, and the seventh lens element: a focal length of the imaging optical lens assembly is f, a composite focal length of the first lens element and the second lens element is f12, a focal length of the fifth lens element is f5, a curvature radius of the image-side surface of the sixth lens element is R12, a curvature radius of the object-side surface of the first lens element is R1, a curvature radius of the image-side surface of the first lens element is R2, and the following conditions are satisfied:

$$-2.50 < f/f12 < -0.10;$$

$$-0.70 < f/f5 < 2.50;$$

$$-2.40 < f/R1 < -0.65;$$

$$-1.50 < f/R12 < -0.10; \text{ and}$$

$$0.18 < R1/R2 < 0.80.$$

2. The imaging optical lens assembly of claim 1, wherein the focal length of the imaging optical lens assembly is f, the curvature radius of the object-side surface of the first lens element is R1, and the following condition is satisfied:

$$-1.75 < f/R1 < -1.10.$$

3. The imaging optical lens assembly of claim 1, wherein the focal length of the imaging optical lens assembly is f, the focal length of the fifth lens element is f5, a composite focal length of the first lens element, the second lens element, the third lens element and the fourth lens element is f1234, and the following conditions are satisfied:

$$-0.60 < f/f5 < 0.60; \text{ and}$$

$$0.25 < f/f1234 < 1.50.$$

4. The imaging optical lens assembly of claim 1, wherein the focal length of the imaging optical lens assembly is f, the curvature radius of the image-side surface of the sixth lens element is R12, and the following condition is satisfied:

$$-1.40 < f/R12 < -0.40.$$

5. The imaging optical lens assembly of claim 1, wherein the focal length of the imaging optical lens assembly is f, a composite focal length of the third lens element, the fourth lens element and the fifth lens element is f345, and the following condition is satisfied:

$$-0.20 < f/f345 < 1.00.$$

6. The imaging optical lens assembly of claim 1, wherein an axial distance between the fourth lens element and the fifth lens element is T45, an axial distance between the fifth lens element and the sixth lens element is T56, an axial distance between the sixth lens element and the seventh lens element is T67, a sum of all axial distances between each of adjacent lens elements of the imaging optical lens assembly is $\Sigma AT$, and the following condition is satisfied:

$$0.00 < (T45+T56+T67)/\Sigma AT < 0.49.$$

7. The imaging optical lens assembly of claim 1, wherein a refractive index of the second lens element is N2, the focal length of the imaging optical lens assembly is f, a focal length of the first lens element is f1, and the following conditions are satisfied:

$$1.63 < N2 < 1.95; \text{ and}$$

$$-0.82 < f/f1 < -0.30.$$

8. The imaging optical lens assembly of claim 1, wherein an axial distance between the object-side surface of the first lens element and the image-side surface of the seventh lens element is TD, an axial distance between the object-side surface of the first lens element and an image surface is TL, and the following condition is satisfied:

$$0.50 < TD/TL < 0.82.$$

* * * * *